United States Patent
Tibbits et al.

(10) Patent No.: US 10,513,089 B2
(45) Date of Patent: Dec. 24, 2019

(54) SELF-TRANSFORMING STRUCTURES

(71) Applicants: Massachusetts Institute of Technology, Cambridge, MA (US); Carbitex, Inc., Kennewick, WA (US)

(72) Inventors: Skylar J. E. Tibbits, Boston, MA (US); Athina Papadopoulou, Cambridge, MA (US); Junus Ali Khan, Kennewick, WA (US)

(73) Assignees: Massachusetts Institute of Technology, Cambridge, MA (US); Carbitex, Inc., Kennewick, WA (US)

( * ) Notice: Subject to any disclaimer, the term of this patent is extended or adjusted under 35 U.S.C. 154(b) by 594 days.

(21) Appl. No.: 14/879,035

(22) Filed: Oct. 8, 2015

(65) Prior Publication Data
US 2016/0101594 A1   Apr. 14, 2016

Related U.S. Application Data

(60) Provisional application No. 62/061,197, filed on Oct. 8, 2014.

(51) Int. Cl.
*B32B 7/02* (2019.01)
*B32B 3/16* (2006.01)
(Continued)

(52) U.S. Cl.
CPC ............... *B32B 7/02* (2013.01); *B32B 3/16* (2013.01); *B32B 5/02* (2013.01); *B32B 5/024* (2013.01);
(Continued)

(58) Field of Classification Search
CPC .......... B32B 3/16; B32B 5/024; B32B 27/06; B32B 27/34; B33Y 80/00
See application file for complete search history.

(56) References Cited

U.S. PATENT DOCUMENTS 3,081,514 A * 3/1963 Griswold ............... D04H 1/736
                                                    162/114
3,391,048 A * 7/1968 Dyer ........................ D04H 3/10
                                                    156/181
(Continued)

FOREIGN PATENT DOCUMENTS

DE   20 2008 015 143 U1   3/2009
GB          2455167 A     6/2009
(Continued)

OTHER PUBLICATIONS

"Muscle Flber Organization" acquired from https://oli.cm.edu/jcourse/workbook/activity/page?context=b880ee6c80020ca60176cda86237b123 on Mar. 18, 2018.*
(Continued)

*Primary Examiner* — Gerard Higgins
(74) *Attorney, Agent, or Firm* — Hamilton, Brook, Smith & Reynolds, P.C.

(57) ABSTRACT

A self-transforming structure is formed from a flexible, fibrous composite having a weave pattern of fibers woven at intersecting angles, the weave pattern having a boundary and one or more axes for the fibers, and an added material coupled to the flexible, fibrous composite to form a structure, wherein the flexible, fibrous composite and the added material have different expansion or contraction rates in response to an external stimulus to cause the structure to self-transform, and wherein the added material has a grain pattern oriented relative the weave pattern of the flexible, fibrous composite. Applications of the self-transforming structures include aviation, automotive, apparel/footwear, furniture, and building materials. One particular example is for providing adaptive control of fluid flow, such as in a jet engine air inlet.

40 Claims, 25 Drawing Sheets

(51) Int. Cl.
　　　*B32B 5/02* (2006.01)
　　　*B32B 27/06* (2006.01)
　　　*B32B 27/34* (2006.01)
　　　*B32B 5/18* (2006.01)
　　　*B32B 27/12* (2006.01)
　　　*B33Y 80/00* (2015.01)

(52) U.S. Cl.
　　　CPC .............. *B32B 5/18* (2013.01); *B32B 27/06* (2013.01); *B32B 27/12* (2013.01); *B32B 27/34* (2013.01); *B32B 2262/106* (2013.01); *B32B 2307/518* (2013.01); *B32B 2307/52* (2013.01); *B32B 2419/00* (2013.01); *B32B 2437/00* (2013.01); *B32B 2437/02* (2013.01); *B32B 2479/00* (2013.01); *B32B 2605/08* (2013.01); *B32B 2605/18* (2013.01); *B33Y 80/00* (2014.12); *Y10T 428/24802* (2015.01); *Y10T 428/24942* (2015.01)

(56) References Cited

U.S. PATENT DOCUMENTS

| | | | |
|---|---|---|---|
| 3,468,748 A * | 9/1969 | Bassett | D04H 3/08 383/118 |
| 4,205,152 A | 5/1980 | Mizuguchi et al. | |
| 4,290,170 A * | 9/1981 | Brookstein | B65H 51/14 19/236 |
| 4,575,330 A | 3/1986 | Hull | |
| 4,674,580 A | 6/1987 | Schuh | |
| 4,735,418 A | 4/1988 | Engel | |
| 6,012,494 A | 1/2000 | Balazs | |
| 6,264,199 B1 | 7/2001 | Schaedel | |
| 6,569,373 B2 | 5/2003 | Napadensky | |
| 7,007,370 B2 | 3/2006 | Gracias et al. | |
| 7,225,045 B2 | 5/2007 | Gothait et al. | |
| 7,300,619 B2 | 11/2007 | Napadensky et al. | |
| 7,500,846 B2 | 3/2009 | Eshed et al. | |
| 7,851,122 B2 | 12/2010 | Napadensky | |
| 8,475,074 B1 | 7/2013 | Henry | |
| 8,652,602 B1 | 2/2014 | Dolla | |
| 8,992,183 B2 | 3/2015 | Perich et al. | |
| 9,079,337 B2 | 7/2015 | Lipton et al. | |
| 9,487,378 B2 | 11/2016 | MacCurdy et al. | |
| 9,723,866 B2 | 8/2017 | Lipson et al. | |
| 9,993,104 B2 | 6/2018 | Lipton et al. | |
| 10,118,339 B2 | 11/2018 | Lipton et al. | |
| 10,132,931 B2 | 11/2018 | MacCurdy et al. | |
| 10,259,161 B2 | 4/2019 | Lipton et al. | |
| 2002/0043950 A1 | 4/2002 | Yim et al. | |
| 2002/0104973 A1 | 8/2002 | Kerekes | |
| 2002/0116847 A1 | 8/2002 | Yen | |
| 2003/0090034 A1 | 5/2003 | Mülhaupt et al. | |
| 2005/0227560 A1* | 10/2005 | Allred, III | B29C 70/342 442/172 |
| 2007/0036964 A1 | 2/2007 | Rosenberger et al. | |
| 2008/0027199 A1 | 1/2008 | Mazurek et al. | |
| 2008/0066393 A1 | 3/2008 | Sorensen | |
| 2008/0109103 A1 | 5/2008 | Gershenfeld et al. | |
| 2008/0269420 A1 | 10/2008 | Tong | |
| 2008/0282527 A1 | 11/2008 | Beck et al. | |
| 2009/0233067 A1 | 9/2009 | Doornheim et al. | |
| 2010/0168439 A1 | 7/2010 | Olson | |
| 2011/0285052 A1 | 11/2011 | Wigand et al. | |
| 2012/0068378 A1 | 3/2012 | Swanson et al. | |
| 2012/0133080 A1 | 5/2012 | Moussa et al. | |
| 2012/0308805 A1 | 12/2012 | Sella | |
| 2013/0040091 A1 | 2/2013 | Dikovsky et al. | |
| 2013/0073068 A1 | 3/2013 | Napadensky | |
| 2013/0089642 A1 | 4/2013 | Lipson et al. | |
| 2013/0249981 A1 | 9/2013 | Nakagawa | |
| 2014/0013962 A1 | 1/2014 | Lipton et al. | |
| 2014/0050811 A1 | 2/2014 | Lipton et al. | |
| 2015/0014881 A1 | 1/2015 | Elsey | |
| 2015/0158244 A1 | 6/2015 | Tibbits et al. | |
| 2015/0174885 A1 | 6/2015 | Khan | |
| 2016/0023403 A1 | 1/2016 | Ramos | |
| 2016/0067918 A1 | 3/2016 | Milar | |
| 2016/0214321 A1 | 7/2016 | Tow et al. | |
| 2017/0042034 A1 | 2/2017 | MacCurdy et al. | |
| 2017/0057704 A1 | 3/2017 | Li et al. | |
| 2017/0120535 A1 | 5/2017 | MacCurdy et al. | |
| 2017/0326785 A1 | 11/2017 | MacCurdy et al. | |
| 2018/0156204 A1 | 6/2018 | Lipton | |
| 2018/0194106 A1 | 7/2018 | Tibbits et al. | |
| 2018/0195213 A1 | 7/2018 | Tibbits et al. | |
| 2018/0281295 A1 | 10/2018 | Tibbits et al. | |
| 2018/0311833 A1 | 11/2018 | Lipton et al. | |

FOREIGN PATENT DOCUMENTS

| | | |
|---|---|---|
| WO | WO 00/69747 | 11/2000 |
| WO | 01/78968 A1 | 10/2001 |
| WO | 2014014892 A2 | 1/2014 |
| WO | WO 2015/084422 A1 | 6/2015 |
| WO | WO 2015/139095 A1 | 9/2015 |
| WO | WO 2016/057853 | 4/2016 |
| WO | WO 2017/079475 A1 | 5/2017 |
| WO | 2018/187514 A1 | 10/2018 |

OTHER PUBLICATIONS

"Skeletal Muscle Organ Anatomy" acquired from https://oli.cm.edu/jcourse/workbook/activity/page?context=b880ee6b80020ca601351c786c5dfea8 on Mar. 18, 2018.*
International Search Report and Written Opinion for International Application No. PCT/US2016/060386, titled: "Additive Manufacturing of a Structure by Deposition of Solidifying and Non-Solidifying Materials;" dated Mar. 27, 2017.
International Preliminary Report on Patentability and Written Opinion for International Application No. PCT/US2015/054786, titled: "Self-Transforming Structures;" dated Apr. 11, 2017.
International Preliminary Report on Patentability for International Application No. PCT/US2014/018373, titled: "Object of Additive Manufacture With Encoded Predicted Shape Change," dated Jun. 7, 2016.
Invitation to Pay Additional Fees and Partial International Search for International Application No. PCT/US2016/060386, titled: "Actuatable Assemblies Fabricatable by Deposition of Solidifying and Non-Solidifying Materials," dated Feb. 3, 2017.
3D Printing (Photolithography), MRSEC Education Group, University of Wisconsin—Madison. Accesed: Nov. 23, 2016.
About Additive Manufacturing, Additive Manufacturing Research Group, Loughborough University, copyright 1016, http://www.lboro.ac.uk!research/amrg/about/the7categoriesofadditivemanufacturing/.
Aguilera, E., et al., "3D Printing of Electro Mechanical Systems," *24th International SFF Symposium—An Additive Manufacturing Conference, SFF 2013*, pp. 950-961 (2013).
Ahn, J-H., et al., "Heterogeneous Three-Dimensional Electronics by Use of Printed Semiconductor Nanomaterial," *Science*, 314: 1754-1757 (2006).
Akhavan, V., et al., "Reacting Thick-Film Copper Conductive Inks with Photonic Curing," 5 pages (2013).
Altan, T., et al., "Manufacturing of Dies and Molds," 19 pages (2001).
Bailey, S.A., et al., "Biomimetic Robotic Mechanisms via Shape Deposition Manufacturing," pp. 1-8 (2000).
Bartlett, Nicholas W., et al., "A 3D-printed, functionally graded soft robot powered by combustion," *Science*, 349(6244): 161-166 (Jul. 10, 2015).
Bendsøe, M.P. and Kikuchi, N., "Generating Optimal Topologies in Structural Desing Using a Homogenization Method," *Comp. Meth. App. Mech. Eng.*, 71: 197-224 (1988).
Berman, B., "3-D Printing: The New Industrial Revolution," *Business Horizons*, 55: 155-162 (2012).
Bhargava, K. et al., "Discrete Elements for 3D Microfluidics," *PNAS*, 111(42): 15013-15018 (2014).

(56) References Cited

OTHER PUBLICATIONS

Bicchi, A. and Tonietti, G., "Fast and 'Soft-Arm' Tactics," *IEEE Robotics & Automation Magazine*, 22-33 (2004).
Blakely, Andrew M., "Bio-Pick, Place, and Perfuse: A New Instrument for 3D Tissue Engineerin " *Tissue Engineering: Part C*, vol. 00, No. 00, pp. 1-10 (2015).
Borghino, D., "Voxel8 Paves the Way for 3D-Printed Electronics," Accessed at www.gizmag.com pp. 1-6 (Jan. 14, 2015).
Bruyas, A., et al., "Combining Multi-Material Rapid Prototyping and Pseudo-Rigid Body Modeling for a New Compliant Mechanism," *2014 IEEE International Conference on Robotics & Automation (ICRA)*, pp. 3390-3396 (2014).
Cali, J., et al., "3D-Printing of Non-Assembly, Articulated Models," *ACM Trans. Graph.*, Article No. 130, 31(6): 1-8 (2012).
Cantatore, E., "Applications of Organic and Printed Electronics, A Technology-Enabled Revolution," Springer Publishers, ISBN No. 978-1-4614-3159-6, pp. 1-187 (2013).
Cheney, N., et al., "Unshackling Evolution," *SIGEVOlution*, 7(1): 11-23 (2013).
Christenson, K.K., et al., "Direct Printing of Circuit Boards Using Aerosol Jet®," *Tech. Prog. Proc.*, pp. 433-436 (2011).
Church, K., et al., "Commercial Applications and Review for Direct Write Technologies," *Mat. Res. Soc. Symp. Proc.*, 624: 3-8 (2000).
Comber, D.B., et al., "Design, Additive Manufacture, and Control of a Pneumatic MR-Compatible Needle Driver," *IEEE Trans. Rob.*, 1-12 (2015).
Coros, S., et al., "Computational Design of Mechanical Characters," 12 pages (2013).
De Laurentis, K.J., et al., "Procedure for Rapid Fabrication of Non-Assembly Mechanisms with Embedded Components," *Proceedsing of DETC'02: ASME 2002 Design Engineering Technical Conferences and Computers and Information in Engineering Conference*, pp. 1-7 (2002).
Derby, B., "Inkjet Printing of Functional and Structural Materials: Fluid Property Requirements, Feature Stability, and Resolution," *Annu. Rev. Mater. Res.*, 40: 395-414 (2010).
Dimas, L.S., et al., "Tough Composites Inspired by Mineralized Natural Materials: Computation, 3D Printing, and Testing," *Adv. Funct. Mater.*, 23(36): 1-10 (2013).
Doubrovski, E.L., et al. ,"Voxel-Based Fabrication Through Material Property Mapping: A Design Method for Bitmap Printing," *Computer-Aided Design*, 60: 3-13 (2015).
Dutta, D., et al., "Layered Manufacturing: Current Status and Future Trends," *Trans. ASME*, 1:60-71 (Mar. 2001).
Eaton, M., et al., "The Modellilng, Prediction, and Experimental Evaluation of Gear Pump Meshing Pressures with Particular Reference to Aero-Engine Fuel Pumps," *Proc. IMechE*, 220 (Part 1): 365-379 (2006).
Espalin, D., et al., "3D Printing Multifunctionality: Structures with Elements," *Int. J. Adv. Manuf. Technol.*, 72: 963-978 (2014).
Ferry, P.W., et al., "A Review on Stereolithography and Its Applications in Biomedical Engineering," *Biomat.*, 31: 6121-6130 (2010).
Fuller, S.B., et al., "Ink-Jet Printed Nanoparticle Microelectromechanical Systems," *J. Microelec. Sys.*, 11(1): 54-60 (2002).
Gong, H., et al., "High Density 3D Printed Microfluidic Valves, Pumps, and Multiplexers, Lab on a Chip" *Royal Society of Chemistry*, 9 pages (2016).
Grunewald, S., "Nano Dimension Unveils the DragonFly 2020, World's First Desktop Electronic 3D Printer," *Downloaded from* https://3DPrint.com, *The Voice of 3D Printing Technologies*, pp. 1-5 (Nov. 18, 2015).
Grzesiak, A., et al., "The Bionic Handling Assistant: A Success Story of Additive Manufacturing," Assemb. Autom., 31(4): 329-333 (2011).
Hawkes et al. Programmable matter by folding, *PNAS*, vol. 107(28): 12441-12445 (2010).
Hiller, J. and Lipson, H., "Automatic Design and Manufacture of Soft Robots," IEEE Trans. Rob., 28(2): 457-466 (2012).
Hiller, J. and Lipson, H., "Methods of Parallel Voxel Manipulation for 3D Digital Printing," pp. 200-211 (2007).

Hiller, J. and Lipson, H., "Tunable Digital Material Properties for 3D Voxel Printers," *Rapid Prototyping Journal*, 16(4): 241-247 (2009).
Hiller, J.D., et al., "Microbricks for Three-Dimensional Reconfigurable Modular Microsystems," *J. Microelec. Sys.*, 20(5): 1089-1097 (2011).
Huber, C., et al., 3D Print of Polymer Bonded Rare-Earth Magnets, and 3D Magnetic Field Scanning with an End-User 3D Printer, *Applied Physics Letters*, 109: 162401-1 162401-4 (2016).
Ionov, L., "Soft Microorigami: self-folding polymer films," *Soft Matter*, 7: 6786 (Published online May 24, 2011).
Jeffrey, C., "V-One Conductive Ink Printer Aims to Short-Circuit Electronic Prototyping," accessed on www.gizmag.com pp. 1-6 (Feb. 10, 2015).
Jeong, K-U. et al., "Three-dimensional actuators transformed from the programmed two-dimensional structures via bending, twisting and folding mechanisms," *Journal of Materials Chemistry*, 21: 6824-6830 (2011).
Kang, H., et al., "Direct Intense Pulsed Light Sintering of Inkjet-Printed Copper Oxide Layers within Six Milliseconds," *ACS Appl. Mater. Interfaces*, 6:1682-1687 (2014).
Kolesky, D.B., et al. ,"3D Bioprinting of Vascularized, Heterogeneous Cell-Laden Tissue Constructs," *Adv. Mater.*, 26:3124-3130 (2014).
Kong, Y.L., et al., "3D Printed Quantum Dot Light-Emitting Diodes," *Nano. Lett.*, 14:7017-7023 (2014).
Knuth, J.P., et al., "Progress in Additive Manufacturing and Rapid Prototyping," *Annals CIRP*, 47(2): 525-540 (1998).
Kuehn, T. and Rieffel, J., "Automatically Designing and Printing 3-D Objects with EvoFab 0.2," *Artificial Life*, 13: 372-378 (2012).
Laschi, C., et al., "Soft Robot Arm Inspired by the Octopus," *Adv. Rob.*, 26: 709-727 (2012).
Li, B., et al., "Robust Direct-Write Dispensing Tool and Solutions for Micro/Meso-Scale Manufacturing and Packaging," *ASME Proceedings of the 2007 International Maufacturing Science and Engineering Conference*, pp. 1-7 (2007).
Li, X., "Embedded Sensors in Layered Manufacturing," *Dissertation submitted to Stanford University*, pp. 1-152 (Jun. 2001).
Lin, H.-T., et al., "GoQBot: A Caterpillar-Inspired Soft-Bodied Rolling Robot," Bioinsp. Biomim., 6: 1-14 (2011).
Lipson, H., "Challenges and Opportunities for Design, Simulation, and Fabrication of Soft Robots," Soft Robotics, 1(1): 21-27 (2014).
Lipson, H., and Kurman, M., "Factory@Home—The Emerging Economy of Personal Manufacturing," One of a series of Occasional Papers in Science and Technology Policy, pp. 1-103 (Dec. 2010).
Lipton, J. et al., "Fab@Home Model 3: A More Robust, Cost Effective and Accessible Open Hardware Fabrication Platform," 125-135 (2012).
Louis-Rosenberg, J., "Drowning in Triangle Soup: the Quest for a Better 3-D Printing File Format," *XRDS*, 22(3): 58-62 (2016).
MacCurdy, R., et al., "Bitblox: A Printable Digital Material for Electromechanical Machines," Int'l J. Robotics Res., 33(10), 1342-1360 (2014).
MacCurdy, R., et al., "Printable Hydraulics: A Method for Fabricating Robots by 3D Co-Printing Solids and Liquids," *2016 IEEE International Conference on Robotics and Automation (ICRA)*, pp. 1-8 (2016).
MacCurdy, R., et al., "Printable Programmable Viscoelastic Materials for Robots," *IEEE/RSJ International Conference on Intelligent Robots and Systems (IROS)*, pp. 1-8 (2016).
MacDonald, E., et al., "3D Printing for the Rapid Prototyping of Structural Electronics," *IEEE*, 2:234-242 (2014).
Macdonald, N.P., et al., "Assessment of Biocompatibility of 3D Printed Photopolymers Using Zebrafish Embryo Toxicity Assays," *Royal Society of Chemistry—Lab on a chip*, 16: 291-297 (2016).
Mack, E., "Beyond 3D Printers and the Coming of the Home Electronics Factory," www.gizmag.com, pp. 1-5 (Oct. 22, 2014).
Malone, E., and Lipson, H., "Multi-Material Freeform Fabrication of Active Systems," *Proceedings of the 9th Biennial ASME Conference on Engineering Systems Design and Analysis*, pp. 1-9, (2008).
Mannoor, M.S., et al., "3D Printed Bionic Ears," *Nano. Lett.*, 13: 2634-2639 (2013).

(56) References Cited

OTHER PUBLICATIONS

Mao, Y., et al., "Scientific Reports: Sequential Self-Folding Structures by 3D Printed Digital Shape Memory Polymers," *Nature*, pp. 1-12 (2015).
Marchese, A.D., et al., "A Recipe for Soft Fluidic Elastomer Robots," *Soft Robotics*, 2(1): 7-25 (2015).
Mehta, A., et al., "Cogeneration of Mechanical, Electrical, and Software Design for Printable Robots from Structural Specifications," *Int. Rob. Sys.*: 2892-2897 (2014).
Mehta, A., et al., "Integrated Codesign of Printable Robots," *J. Mech. Rob.*, 7: 1-10 (2015).
Meisel, N.A., et al, "A Procedure for Creating Actuated Joints via Embedding Shape Memory Alloys in Polyjet 3D Printing," *J. Intel. Mat. Sys. Struct.*, pp. 1-15 (2014).
Melchels, F. P.W., et al., "A review on stereolithography and its applications in biomedical engineering," *Biomaterials*, 31:6121-6130 (2010).
Merz, R, "Shape Deposition Manufacturing," *Proceedings of the Solid Freeform Fabrication Symposium, The University of Texas at Austin*, pp. 1-7 (1994).
Merz, R, et al., Dissertation entitled "Shape Deposition Manufacturing," pp. 1-190 (1994).
Mironov, V., et al., "Organ Printing: Computer-Aided Jet-Based 3D Tissue Engineering," *Trends Biotech.*, 21(4):157-161 (2003).
Morin, S.A., et al., "Using Click-e-Bricks to Make 3D Elastomeric Structures," *Adv. Mater.*, 26: 5991-5999 (2014).
Mueller, S., et at , "faBrickation: Fast 3D Printing of Functional Objects by Integrating Construction Kit Building Blocks," *Session: 3D Printing and Fabrication*, 3827-3834 (2014).
Mueller, S., et al., "Mechanical Properties of Parts Fabricated with Inkjet 3D Printing Through Efficient Experimental Design," *Materials and Design*, 86:902-912 (2015).
Murphy, S.V. and Atala, A., "3D Bioprinting of Tissues and Organs," *Nat. Biotech.*, 32(8):773-785 (2014).
Murray, C., "Smart Actuator Propels Hydraulic 'Beast of Burden'", Design News [online], Jun. 4, 2015 [retrieved Oct. 21, 2016]. Retrieved from the Internet URL: http://www.designnews.com/document.asp?doc_id=277754.
O'Donnell, J., et al., "A Review on Electromechanical Devices Fabricated by Additive Manufacturing," *J. of Manufacturing Science and Engineering*, pp. 1-45 (2015).
Palmer, J.A., et al., "Realizing 3-D Interconnected Direct Write Electronics within Smart Stereolithography Structures," *Proceedings of IMECE2005-2005 ASME International Mechanical Engineering Congress and Exposition*, pp. 1-7 (2005).
Park, S., et al. ,"Self-Assembly of Mesoscopic Metal-Polymer Amphiphiles," *Science*, 303: 348-351 (2004).
Peele, B.N., et al., "3D Printing Antagonistic Systems of Artificial Muscle Using Projection Stereolithography," *Bioinspir. Biomim.*, 10:1-8 (2015).
Popescu, G. A., et al., "Digital Materials for Digital Printing," *Soc. Imaging Sci. Tech.*, pp. 58-61 (2006).
Popescu, G.A., "Digital Materials for Digital Fabrication," Thesis submitted to Massachusetts Institute of Technology, pp. 1-53 (Aug. 20, 2007).
Proto3000: "3D Printed Snow Globe by Proto3000—Thingiverse," Retrieved from the internet: http://www.thingiverse.com/thing:225572, Retrieved on: Jan. 10, 2017.
Rost, A., and Schadle, S., "The SLS-Generated Soft Robotic Hand—An Integrated Approach Using Additive Manufacturing and Reinforcement Learning," IEEE: 215-220 (2013).
Rus, D. and Tolley, M.T., "Design, Fabrication and Control of Soft Robots," *Nature*, 521: 467-475 (2015).
Russo, A., et al., "Pen-On-Paper Flexible Electronics," *Adv. Mater.*, 23: 3426-3430 (2011).
Saari, M., et al., "Fiber Encapsulation Additive Manufacturing: An Enabling Technology for 3D Printing of Electromechanical Devices and Robotic Components," *3D Printing*, 2(1):32-39 (2015).
Safari, A., et al., "Solid Freeform Fabrication of Piezoelectric Sensors and Actuators," *J. Mat. Sci.*, 41: 177-198 (2006).
Saleh, E., el al., "3D Inkjet-Printed UV-Curable Inks for Multi-Functional Electromagnetic Applications," *Proceedings of ISFA2014*, pp. 1-5 (2014).
Sangani, K., "How to . . . Print Gadgets," *Engineering & Technology*, pp. 58-60 (2013).
Sharmis Passions, "Eggless Chocolate Cake—Moist Chocolate Cake Recipe (No eggs No butter)," http://www.sharmispassions.com/201 0/03/simple-moi stchocolate-cakewith-no-eggs. html, pp. 1-37 (posted Mar. 27, 2010).
Sitthi-Amorn, P., et al., "MultiFab: A Machine Vision Assisted Platform for Multi-Material 3D Printing," *ACM lransactions on Graphics*, Article No. 129, 34(4): 1-11 (2015).
Slightam, J.E. and Gervasi, V.R., "Novel Integrated Fluid-Power Actuators for Functional End-Use Components and Systems via Selective Laser Sintering Nylon 12," *23rd Ann Int Solid Freeform Fabrication Symp*: pp. 197-211 (2012).
Slotwinski, J.A., "Materials Standards for Additive Manufacturing," *National Institute of Standards and Technology (NIST), PDES, Inc. Workshop* (Mar. 14, 2013).
Snyder, T.J., et al., "3D Systems' Technology Overview and New Applications in Manufacturing, Engineering, Science, and Education," *Mary Ann Liehert, Inc.*, 1(3):169-176 (2014).
Takatsu, H., et al., "Stress Analysis Method of U-Shaped Bellows and Its Experimental Verification," *Fusion Eng. & Des.*, 22: 239-250 (1993).
Tanaka, M., "Fatigue Life Estimation of Bellows Based on Elastic-Plastic Calculations," *Int. J. Pres. Ves. & Piping*, 2: 51-68 (1974).
Thomaszewski, B., et al., "Computational Design of Linkage-Based Characters," 9 pages (2014).
Thryft, Ann R., "3D Printing Now Good Enough for Final & Spare Car Parts," downloaded from www.designnews.com, 3 pages, (Jul. 22, 2016).
Tibbets, S. and Cheung, K., "Programmable Materials for Architectural Assembly and Automation," *Assembly Automation*, 32(3): 216-225 (2012).
Tolley, M.T., et al,"A Resilient, Untethered Soft Robot," *Soft Robotics*, 1(3): 213-223 (2014).
Torrisi, F., et al., "Inkjet-Printed Graphene Electronics," *Am. Chem. Soc.*, 6(4): 2992-3006 (2012).
Tumbleston, J.R., et al., "Continuous Liquid Interface Production of 3D Objects," *Research Reports*, 347(6228): 1349-1353 (2015).
Tunisianswife, Easy Chocolate Bundt Cake Glaze (allrecipies.com accessed Jun. 6, 2016) http:/ /all recipes. com/recipe/1 00335/easy -choco late-bu ndt -cake-glaze/.
Ultem®/PEI (Polyetherimide): Aetna Plastics, Accessed: Jun. 1, 2016.
Waheed, S., "3D Printed Microfluidic Devices: Enablers and Barriers," *Royal Society of Chemistry, Lab on a chip*, 16: 1993-2013 (2016).
Walker, S.B. and Lewis, J.A., "Reactive Silver Inks for Patterning High-Conductivity Features at Mild Temperatures," *Am. Chem. Soc.*, 134: 1419-1421 (2012).
Wang, L., et al., "Robotic Folding of 2D and 3D Structures from a Ribbon," *IEEE International Conference on Robotics and Automation (ICRA)*, pp. 3655-3660 (2016).
Weiss, L., et al. ,"Shape Deposition Manufacturing of Wearable Computers," pp. 31-38 (1996).
Weiss, L.E., et al., "Shape Deposition Manufacturing of Heterogeneous Structures," *J. Mann. Sys.*, 16(4): 239-248 (1997).
Whitney, J. P., et al., "A Low-Friction Passive Fluid Transmission and Fluid-Tendon Soft Actuator," 8 pages (2014).
Willis, K.D.D., et al., "Printed Optics: 3D Printing of Embedded Optical Elements for Interactive Devices," *UIST'12*, pp. 589-598 (Oct. 2012).
Wu, S-Y., et al., "3D-Printed Microelectronics for Integrated Circuitry and Passive Wireless Sensors," *Microsystems & Nanoengineering*, 1:1-9 (2015).
Xie, T., "Tunable polymer multi-shape memory effect," *Nature Letters*, 464: 267-270 (2010).
Xu, S., et al.,"Soft Microfluidic Assemblies of Sensors, Circuits, and Radios for the Skin," *Science*, 344: 70-74 (2014).
Yap, H.K., et al., "High-Force Soft Printable Pneumatics for Soft Robotic Applications," *Soft Robotics*, 3(3): 144-158 (2016).

(56) References Cited

OTHER PUBLICATIONS

Younsheng, L. and Shuiping, S., "Strength Analysis and Structural Optimization of U-Shaped Bellows," *Int. J. Pres. Ves. & Piping*, 42: 33-46 (1990).
A Brief History of 3D Printing, T. Rowe Price, 1 page (2012).
Armon, Shahaf et al., "Geometry and Mechanics in the Opening of Chiral Seed Pods," *Science* 333:1726-1730 (2011).
Chandler, David L. Printing off the Paper. MIT News (2011); available at: http://web.mit.edu/newsoffice/2011/3d-printing-0914.html 4 pages, (last visited Mar. 3, 2014).
Ge, Qi, el al., "Active materials by four-dimension printing," *Applied Physics Letters* 103:131901-131901-5 (2013).
Guan, Jingjiao, et al. "Self-Folding of Three-Dimensional Hydrogel Microstructures," *Journal of Physical Chemistry B* 109:23134-23137 (2005).
International Search Report and Written Opinion of the International Searching Authority, Application No. PCT/US2015/054786, dated Jan. 11, 2016, Entitled: "Self-Transforming Structures".
Jung et al. "Water-responsive shape memory polyurethane block copolymer modified with polyhedral oligomeric silsesquioxane." *Journal of Macromolecular Science*, Part B 45, 453 (2006).
Kanthal, Thermostatic Bimetal Handbook (2008).
Klein, Yacl, et al. "Shaping of Elastic Sheets by Prescription of Non-Euclidean Metrics," *Science* 315:1116-1120 (2007).
Liu, Ying, et al., Self-Folding by Local Light Absorption (Nov. 10, 2011); screenshots provided, full video available at: http://www/youtube.com/watch?v=NKRWZG67dtQ.
Liu, Ying, et al., "Self-folding of polymer sheets using local light absorption," *Soft Matter* 8(6):1764-1769 (2012).
Notification of Transmittal of the International Search Report, (ISR) and the Written Opinion, (WO) of the International Searching Authority, or the Declaration with ISR and WO, International Application No. PCT/US2014/018373, "Object of Additive Manufacture With Encoded Predicted Shape Change," dated Sep. 3, 2014.
Sharon, Eran and Efrati, Efi., "The mechanics of non-Euclidean plates," *Soft Matter* 6:5693-5704 (2010).
Sharon, Eran et al., "Leaves, Flowers and Garbage Bags: Making Waves," *American Scientist* 92:254-261 (2004).
Sharon, Eran., "Swell Approaches for Changing Polymer Shapes," *Science* 335:1179-1180 (2012).
Tibbits, Skylar J.E,. "4D Printing: Multi-Material Shape Change," *Architectural Design Journal* 84:116-121 (2014).
Tibbits, S., "4D Printing: Self-Assembling Parts in Action at TED2013," by Stratasys Staff, Apr. 29, 2013.
Tibbits, Skylar., "Design to Self Assembly," *Architectural Design Journal* 82(2):68-73 (2012).
Tibbits, Skylar., "The Emergence of 4D Printing," TED Talk filed in Feb. 2012; transcript provided, 6 pages, video available at http://www.ted.com/talks/skylar_tibbits_the_emergence_of_4d_printing.html.
Westbrook, K.K., et al., "A 3D finite deformation constitutive model for amorphous shape memory polymers: A multi-branch modeling approach for nonequilibrium relaxation processes," *Mechanics of Materials* 43:853-869 (2011).
Xia, Fan and Jiang, Lei., "Bio-Inspired, Smart, Multiscale Interfacial Materials," *Advanced Materials* (20):2842-2858 (2008).
Y. S. Touloukian et al., Thermophysical Properties of Matter, vols. 12, Thermal Expansion Metallic Elements and Alloys (1975) (selected pages).
Y. S. Touloukian et al., Thermophysical Properties of Matter, vol. 13, Thermal Expansion Nonmetallic Solids (1977) (selected pages).
Anatomy & Physiology (Open + Free), Unit 5: Muscular System, Module 16, "Skeletal Muscle Organ Anatomy" (Mar. 18, 2018).
Anatomy & Physiology (Open + Free), Unit 6: Muscular System, Module 17, "Muscle Fiber Organization" (Mar. 18, 2018).
Janbaz et al., Programming the shape-shifting of flat soft matter: from self-rolling/self-twisting materials to self-folding pragarni, Materials Horizons, vol. 3, No. 6, pp. 536-547 (2016).
Mao et al., "3D Printed Reversible Shape Changing Components with Stimuli Responsive Materials," Scientific Reports, 6:247612 (2016).
Raviv, Raviv et al., Active Printed Materials for Complex Self-Evolving Deformations, Scientific Reports, 4:7422 (2014).

\* cited by examiner

SELF-TRANSFORMING STRUCTURES

RELATED APPLICATION(S)

This application claims the benefit of U.S. Provisional Application No. 62/061,197, filed on Oct. 8, 2014. The entire teachings of the above application are incorporated herein by reference.

BACKGROUND OF THE INVENTION

Additive manufacturing, sometimes referred to as "3D printing," permits the precise application of materials onto substrates. Recent advances in 3D printing have enabled the fabrication of printed objects encoded with predicted shape change. These objects can transform over time from a first, printed shape to a second, predetermined shape.

SUMMARY OF THE INVENTION

Described herein is a self-transforming structure. The self-transforming structure includes a flexible, fibrous composite having a boundary and fibers along one or more axes that form a weave pattern, and an added material having a grain pattern. The added material can be coupled to the flexible, fibrous composite to form a structure. The flexible, fibrous composite and the added material have different expansion or contraction rates in response to an external stimulus to cause the structure to self-transform. The grain pattern of the added material can be oriented relative the weave pattern of the flexible, fibrous composite to cause a predictable self-transformation of the structure responsive to the external stimulus. The flexible, fibrous composite can be carbon fiber, glass fiber, basalt fiber, liquid crystal polymers, and hybrids thereof.

The weave pattern of the flexible, fibrous composite can be biaxial. The grain pattern of the added material can be orthogonal, oriented at a 45° angle, or oriented at any other angle to an axis of a fiber of the flexible, fibrous composite. The grain pattern of the added material can be 45° to an axis of a fiber of the flexible, fibrous composite. The grain of the added material can be oriented at a 45° angle to a boundary of the flexible, fibrous composite. The grain of the added material can be orthogonal to a boundary of the flexible, fibrous composite. The length of the boundary of the added material can be shorter than the length of the boundary of the flexible, fibrous composite. The length of the boundary of the added material can be the same as the length of the boundary of the flexible, fibrous composite. The fibers of the flexible, fibrous added material can be oriented at 45° angles relative to the boundary of the flexible, fibrous composite. The fibers of the flexible, fibrous added material can be orthogonal to the boundary of the flexible, fibrous composite. The flexible, fibrous composite can be square, rectangular, round, or an arbitrary shape. The flexible, fibrous composite can be rectangular.

In one embodiment having a biaxial, flexible fibrous composite, a) the grain of the added material can be orthogonal to an axis of a fiber of the flexible, fibrous composite; b) the grain of the added material can be oriented at 45° relative to the boundary of the flexible, fibrous composite; c) the length of the boundary of the added material can be shorter than the length of the boundary of the flexible, fibrous composite; and d) the fibers of the flexible, fibrous composite can be oriented at 45° relative to the boundary of the flexible, fibrous composite.

In another embodiment having a biaxial, flexible fibrous composite, a) the grain of the added material can be orthogonal to an axis of a fiber of the flexible, fibrous composite; b) the grain of the added material can be oriented at 45° relative to the boundary of the flexible, fibrous composite; c) the length of the boundary of the added material can be the same as the length of the boundary of the flexible, fibrous composite; and d) the fibers of the flexible, fibrous composite are oriented at 45° relative to the boundary of the flexible, fibrous composite.

In another embodiment having a biaxial, flexible fibrous composite, a) the grain of the added material can be orthogonal relative to an axis of a fiber of the flexible, fibrous composite; b) the grain of the added material can be orthogonal relative to the boundary of the flexible, fibrous composite; c) the length of the boundary of the added material can be shorter than the length of the boundary of the flexible, fibrous composite; and d) the fibers of the flexible, fibrous composite are orthogonal relative to the boundary of the flexible, fibrous composite.

In another embodiment having a biaxial, flexible fibrous composite, a) the grain of the added material can be oriented at a 45° angle relative to an axis of a fiber of the flexible, fibrous composite; b) the grain of the added material can be orthogonal relative to the boundary of the flexible, fibrous composite; c) the length of the boundary of the added material can be the same length as the boundary of the flexible, fibrous composite; and d) the fibers of the flexible, fibrous composite are oriented at a 45° angle relative to the boundary of the flexible, fibrous composite. In some instances, parallel grains of the added material can be on opposite sides of the flexible, fibrous composite.

In another embodiment having a biaxial, flexible fibrous composite, a) the grain of the added material can be orthogonal to an axis of a fiber of the flexible, fibrous composite; b) the grain of the added material can be oriented at 45° relative to the boundary of the flexible, fibrous composite; c) the length of the boundary of the added material can be the same as the length of the boundary of the flexible, fibrous composite; and d) the fibers of the flexible, fibrous composite are oriented at 45° relative to the boundary of the flexible, fibrous composite. Additionally, the added material can provide equal forces in two directions, thereby providing bi-stability.

The weave pattern of the flexible, fibrous composite can be triaxial. The grain of the added material can be orthogonal to an axis of a fiber of the flexible, fibrous composite. The grain of the added material can be oriented at an angle of 0°, 60°, or 120° relative to the boundary of the flexible, fibrous composite. The length of the boundary of the added material can be the same length as the boundary of the flexible, fibrous composite. The fibers of the flexible, fibrous composite are oriented at 60° and 120° angles relative to the boundary of the flexible, fibrous composite.

In one embodiment having a triaxial, flexible fibrous composite, a) the grain of the added material can be orthogonal to an axis of a fiber of the flexible, fibrous composite; b) the grain of the added material can be oriented at a 0° angle relative to the boundary of the flexible, fibrous composite; c) the length of the boundary of the added material can be the same length as the boundary of the flexible, fibrous composite; and d) the fibers of the flexible, fibrous composite are oriented at 60° and 120° angles relative to the boundary of the flexible, fibrous composite.

In one embodiment having a triaxial, flexible fibrous composite, a) the grain of the added material can be orthogonal to an axis of a fiber of the flexible, fibrous composite; b)

the grain of the added material can be oriented at a 60° angle relative to the boundary of the flexible, fibrous composite; c) the length of the boundary of the added material can be the same length as the boundary of the flexible, fibrous composite; and d) the fibers of the flexible, fibrous composite are oriented at 60° and 120° angles relative to the boundary of the flexible, fibrous composite.

In one embodiment having a triaxial, flexible fibrous composite, a) the grain of the added material can be orthogonal to an axis of a fiber of the flexible, fibrous composite; b) the grain of the added material can be oriented at a 120° angle relative to the boundary of the flexible, fibrous composite; c) the length of the boundary of the added material can be the same length as the boundary of the flexible, fibrous composite; and d) the fibers of the flexible, fibrous composite are oriented at 60° and 120° angles relative to the boundary of the flexible, fibrous composite.

The weave pattern of the flexible, fibrous composite can be uniaxial. The grain of the added material can be orthogonal to an axis of a fiber of the flexible, fibrous composite. The grain of the added material can be oriented at an angle of 0°, orthogonal, or 45° relative to the boundary of the flexible, fibrous composite. The length of the boundary of the added material can be the same length as the boundary of the flexible, fibrous composite. The fibers of the flexible, fibrous composite can be orthogonal relative to the boundary of the flexible, fibrous composite.

In one embodiment having a uniaxial, flexible fibrous composite, a) the grain of the added material can be orthogonal to an axis of a fiber of the flexible, fibrous composite; b) the grain of the added material can be oriented at a 0° angle relative to the boundary of the flexible, fibrous composite; c) the length of the boundary of the added material can be the same length as the boundary of the flexible, fibrous composite; and d) the fibers of the flexible, fibrous composite can be orthogonal to the boundary of the flexible, fibrous composite.

In one embodiment having a uniaxial, flexible fibrous composite, a) the grain of the added material can be orthogonal to an axis of a fiber of the flexible, fibrous composite; b) the grain of the added material can be orthogonal to the boundary of the flexible, fibrous composite; c) the length of the boundary of the added material can be the same length as the boundary of the flexible, fibrous composite; and d) the fibers of the flexible, fibrous composite can be orthogonal to the boundary of the flexible, fibrous composite.

In one embodiment having a uniaxial, flexible fibrous composite, a) the grain of the added material can be orthogonal to an axis of a fiber of the flexible, fibrous composite; b) the grain of the added material can be oriented at a 45° angle relative to the boundary of the flexible, fibrous composite; c) the length of the boundary of the added material can be the same length as the boundary of the flexible, fibrous composite; and d) the fibers of the flexible, fibrous composite can be orthogonal to the boundary of the flexible, fibrous composite.

The external stimulus can be exposure to a temperature change. In some instances, exposure to a temperature change can be caused by a laser, infrared light, or electrical resistive heating. The external stimulus can be exposure to water or removal of exposure to water.

Described herein is a method of making a self-transforming structure. The method can include coupling an added material to a flexible, fibrous composite to form a structure. The flexible, fibrous composite can have a boundary and fibers along axes that form a weave pattern. The flexible, fibrous composite and the added material can have different expansion or contraction rates in response to an external stimulus to cause the structure to self-transform. The added material can have a grain pattern oriented relative the weave pattern of the flexible, fibrous composite. Coupling the added material to the flexible, fibrous composite can include printing the added material onto the flexible, fibrous composite by additive manufacturing. Coupling the added material to the flexible, fibrous composite can include laminating the added material onto the flexible, fibrous composite.

The methods and resulting products described herein provide numerous advantages compared to prior 3D printed structures. Flexible, fibrous composite composites have an ordered structure that provides strength and elasticity, which provide benefits in self-transforming structures. The self-transforming structure can be packaged in a flat configuration, and later transformed into a three-dimensional structure at a later time or at a different location.

The self-transforming structures described herein have applications in numerous industries, including aviation, automotive, apparel/footwear, furniture, and building materials.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 8A shows nylon adjacent to carbon fiber prior to lamination. FIG. 8B shows nylon coupled to carbon fiber after lamination and the shape transformation that has occurred.

DETAILED DESCRIPTION OF THE INVENTION

A description of example embodiments of the invention follows.

Self-transforming structures according to example embodiments can be made according to the processes described herein. In general, a flexible, fibrous composite provides a substrate for an added material. Together, the flexible, fibrous composite and the added material form a combined structure. The flexible, fibrous composite and the added material typically have different expansion or contraction rates in response to an external stimulus, which causes the combined structure to self-transform upon exposure to the external stimulus.

As used herein, the term "weave pattern" refers to an ordered arrangement of fibers, which can be intersecting or non-intersecting. Examples of intersecting weave patterns include biaxial and triaxial weave patterns. An example of a nonintersecting weave pattern is a uniaxial weave pattern.

As used herein, a "flexible, fibrous composite" is a composite that provides sufficient ability to bend without delaminating or detaching from the added material coupled to it. Thus, when the self-transforming structure is exposed to an external stimulus, thereby causing the flexible, fibrous composite and the added material to have different expansion or contraction rates, the added material remains laminated or coupled to the flexible, fibrous composite, thereby causing a transformation in shape. Methods of making a flexible, fibrous composite are described in U.S. Patent Publication No. 2015/0174885.

Typically, a flexible, fibrous composite has at least one boundary, and often times more than one boundary. For example, a circular flexible, fibrous composite, as well as flexible fibrous composites having complex curved shapes, have a single boundary. A triangular flexible, fibrous composite has three boundaries. While many of the embodiments described herein are square or rectangular, the principles described are equally applicable to flexible, fibrous composites having other geometric shapes, as well as to flexible, fibrous composites having complex shapes. In these instances, descriptions of orientations relative to a boundary refer to the orientation at any position along a boundary.

Biaxial Weave Patterns and Oriented, Added Material

Typically, the flexible, fibrous composite is formed of woven fibers. A variety of weave patterns are known in the art. The weave patterns described herein are generally referred to as uniaxial, biaxial, and triaxial. The added material is typically applied to the flexible, fibrous composite so that grains of the added material are patterned relative to the weave pattern.

Figure 1:
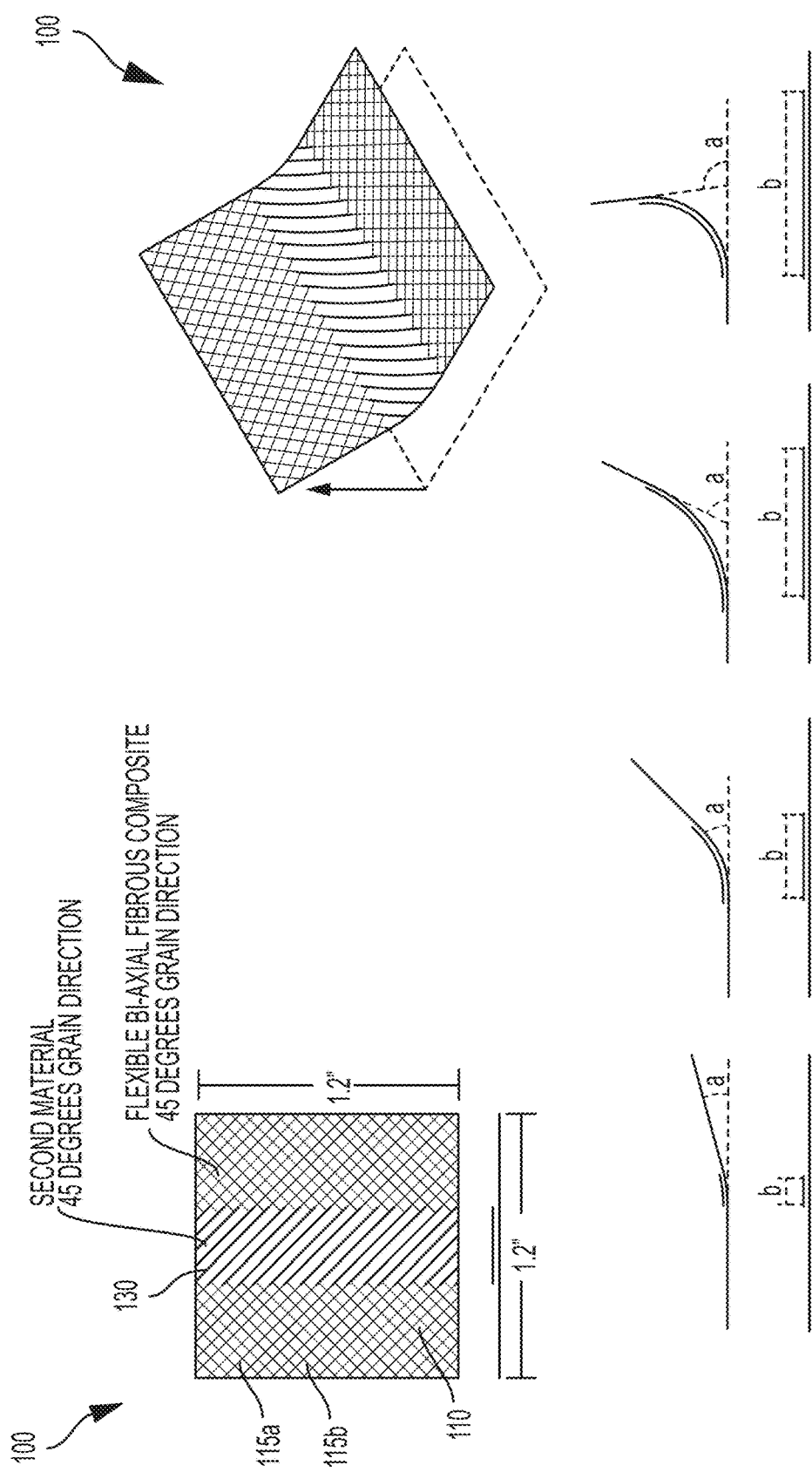
FIG. 1 is an illustration of an embodiment showing self-transformation angles. The angle of self-transformation (a) varies depending on the width (b) of the added material.

FIG. 1 is an illustration of one embodiment of a self-transforming structure 100. The flexible, fibrous composite 110 forms a substrate for grains 130 of the added material. The flexible fibrous composite is formed of intersecting fibers 115a and 115b. In this particular embodiment, the fibers intersect at 90° angles, though other angles of intersection are possible. In the particular example, the grains 130 of the added material are substantially parallel with the fibers 115a of the flexible, fibrous composite 110. In this embodiment, parallel grains of the added material are aligned with and at least partially overlay fibers 115a of the flexible, fibrous composite.

Unique orientations of the grain of the added material relative to the axis of the flexible, fibrous substrate can yield different transformations upon exposure to an external stimulus. Conceptually, four features define the relationship between a biaxial flexible, fibrous composite and the added material. First is the relationship of the grain pattern of the added material to an axis of a fiber of the flexible, fibrous composite. The grain pattern of the added material can be orthogonal to an axis of a fiber of the flexible fibrous composite, or it can be patterned at an angle, such as a 45° angle, relative to an axis of the flexible fibrous composite. Second is the orientation of the grain of the added material relative to a boundary of the flexible, fibrous composite. The grain of the added material can be orthogonal at a boundary, or it can be patterned at an angle, such as a 45° angle, relative to a boundary of the flexible, fibrous composite. Third is the length of a boundary of the added material in relation to the length of a boundary of the flexible, fibrous composite. The length of a boundary of the added material can be the same length as the length of a boundary of the flexible, fibrous composite. Alternatively, the length of a boundary of the added material can be shorter than a boundary of the flexible, fibrous composite. Fourth is the orientation of the fibers of the flexible, fibrous composite relative to a boundary of the flexible, fibrous composite. The fibers of the flexible, fibrous composite can be orthogonal to a boundary of the flexible, fibrous composite. Alternatively, the fibers of the flexible, fibrous composite can be angled, such as at a 45° angle, relative to a boundary of the flexible, fibrous composite. As another optional fifth condition, the added material can be printed on opposing sides of the flexible, fibrous composite, one particular example of which is illustrated in FIG. 2E.

FIGS. 2A-F show six different types of transformations that can be created. In general, FIGS. 2A-F show the relative orientation of a biaxial flexible, fibrous composite and the added material that is coupled to it. The relationship between the four features described in the preceding paragraph and the embodiments of FIGS. 2A-F are summarized in Table 1. The notation underneath the images in the figures indicates the orientation of the fibers of the flexible fibrous composite (left) and the grains of the added material (middle) in degrees (e.g., in FIG. 2A, the orientation of the fibers is at a 45 degree angle relative to the horizon, and the orientation of the grains is also at a 45 degree angle relative to the horizon).

TABLE 1

Features of biaxial flexible, fibrous composite and added material illustrated in FIGS. 2A-F.

| FIG. and Transformation | 1. Relationship of the grain pattern of added material to an axis of a fiber of the flexible, fibrous composite | 2. Orientation of the grain of the added material relative to a boundary of the flexible, fibrous composite | 3. Length of a boundary of the added material in relation to the length of a boundary of the flexible, fibrous composite | 4. Orientation of the fibers of the flexible, fibrous composite relative to a boundary of the flexible, fibrous composite |
|---|---|---|---|---|
| 2A: Fold | Orthogonal | 45° to one another | Shorter | 45° to one another |
| 2B: Curve | Orthogonal | 45° to one another | Same length | 45° to one another |
| 2C: Twist | Orthogonal | Orthogonal | Shorter | Orthogonal |
| 2D: Spiral | 45° to one another | Orthogonal | Same length | 45° to one another |
| 2E: Wave | Orthogonal | 45° to one another | Shorter | 45° to one another |
| 2F: Bi-stable | Orthogonal | 45° to one another | Same length | 45° to one another |
| 2G: Fold | Orthogonal | 45° to two boundaries | Shorter | 45° to one another |

Figure 2A:
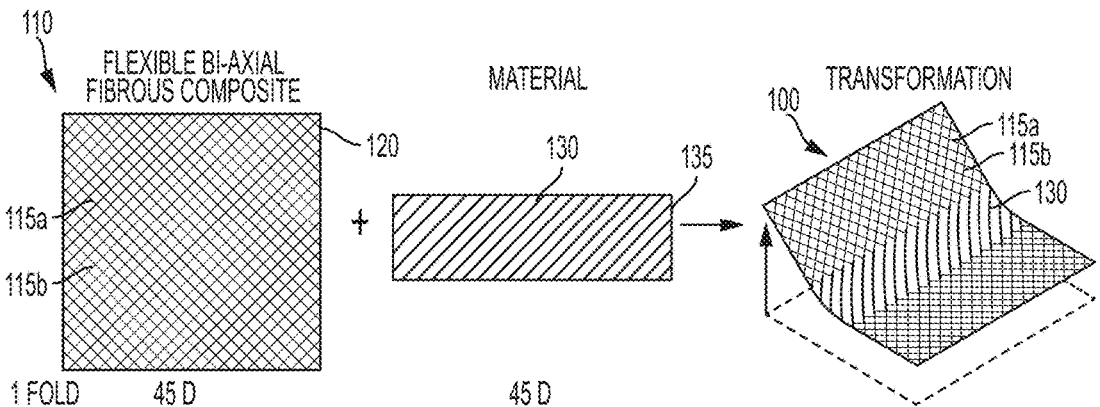
FIGS. 2A-G are illustrations of transformations on a biaxial fibrous composite: 2A) Fold; 2B) Curve; 2C) Twist; 2D) Spiral; 2E) Wave; 2F) Bi-stable transformation; G) Fold.

FIG. 2A shows a fold transformation. Parallel grains 130 of the added material are orthogonal to an axis of a fiber 115a of the flexible, fibrous composite, and coaxial with an axis of the other fiber 115b. The grain 130 of the added material is oriented at a 45° angle relative to its own boundary 135 and relative to the boundary 120 of the flexible, fibrous composite. The length of a boundary 135 of the added material 130 is shorter than the length of a boundary 120 of the flexible, fibrous composite. The fibers 115a and 115b of the flexible, fibrous composite are oriented at a 45° angle relative to its own boundary 120. In this particular example, the flexible, fibrous composite 110 is square; however, it need not be square in order to achieve a folding transformation.

Figure 2B:
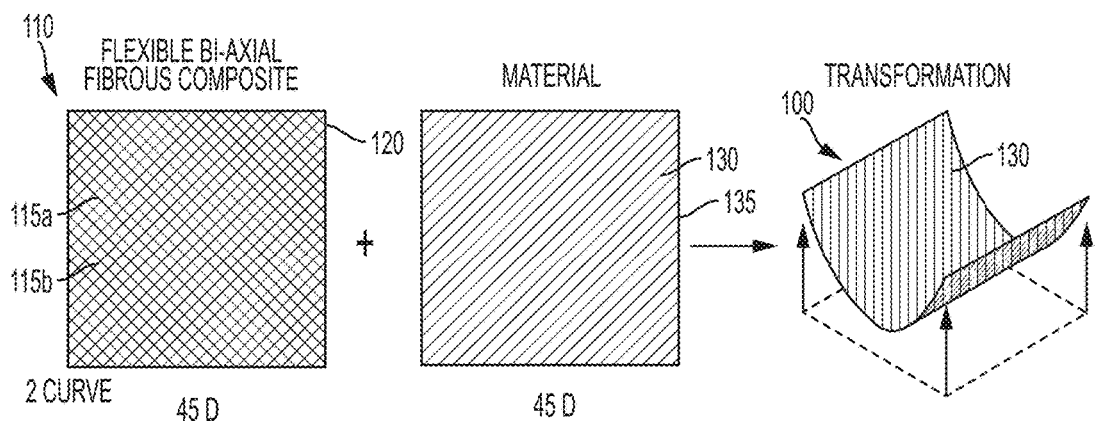

FIG. 2B shows a curve transformation. Parallel grains 130 of the added material are orthogonal to an axis of a fiber 115a of the flexible, fibrous composite, and coaxial with an axis of the other fiber 115b. The grain 130 of the added material is oriented at a 45° angle relative to its own boundary 135 and relative to the boundary 120 of the flexible, fibrous composite. The length of a boundary 135 of the added material 130 is the same, or substantially the same, as the length of a boundary 120 of the flexible, fibrous composite. The fibers 115a and 115b of the flexible, fibrous composite are oriented at a 45° angle relative to its own boundary 120. In this particular example, the flexible, fibrous composite 110 is square; however, it need not be square in order to achieve a folding transformation. Unlike the fold shown in FIG. 2A, a curve can occur when the added material covers all, or substantially all, of a surface of the flexible, fibrous composite.

Figure 2C:
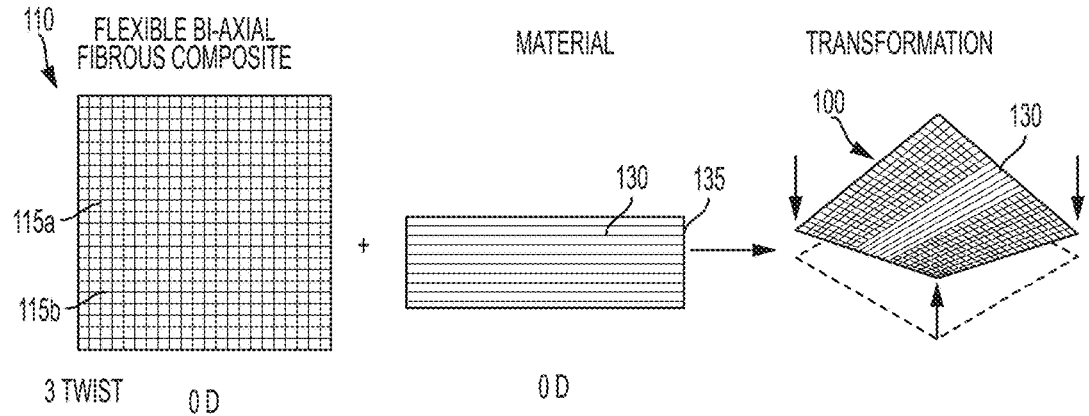

FIG. 2C shows a twist transformation. Parallel grains 130 of the added material are orthogonal to an axis of a fiber 115a of the flexible, fibrous composite, and coaxial with an axis of the other fiber 115b. The grain 130 of the added material is oriented orthogonally relative to its own boundary 135 and relative to the boundary 120 of the flexible, fibrous composite. The length of a boundary 135 of the added material 130 is shorter than the length of a boundary 120 of the flexible, fibrous composite. The fibers 115a and 115b of the flexible, fibrous composite are oriented orthogonally relative to its own boundary 120. The flexible, fibrous composite 110 is square; however, it need not be square in order to achieve a twist transformation.

Figure 2D:
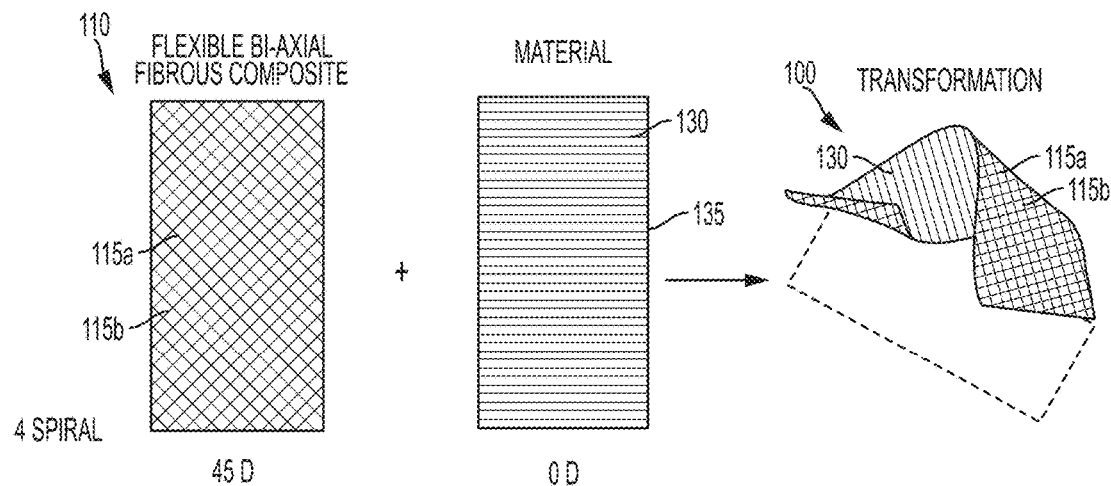
Figure 2E:
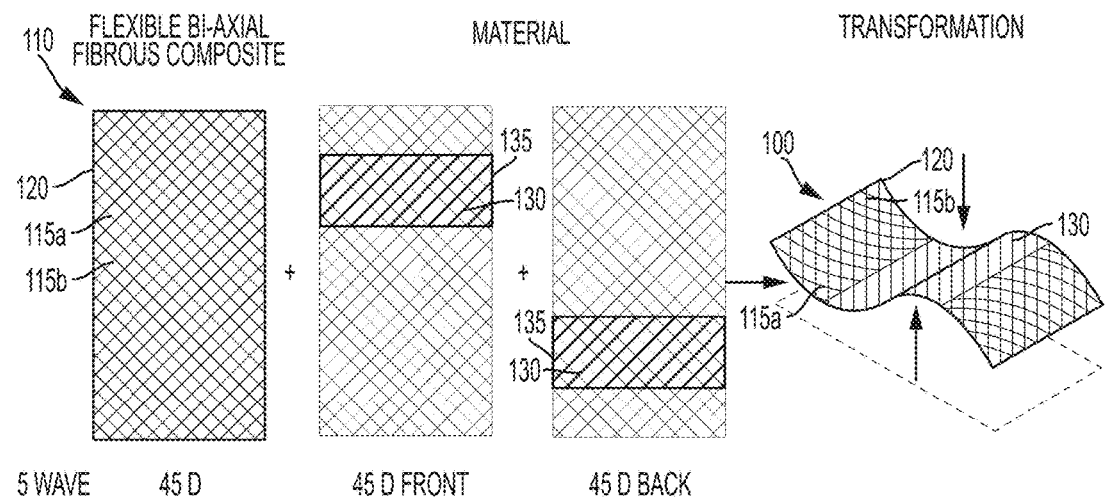

FIG. 2D shows a spiral transformation. Parallel grains 130 of the added material are oriented at 45° angles relative to both axes of fiber 115a and 115b of the flexible, fibrous composite. The grain 130 of the added material is oriented orthogonally relative to its own boundary 135 and relative to the boundary 120 of the flexible, fibrous composite. The length of a boundary 135 of the added material 130 is the same as, or substantially similar to, the length of a boundary 120 of the flexible, fibrous composite. The fibers 115a and 115b of the flexible, fibrous composite are oriented at 45° angles relative to its own boundary 120. Unlike the twist shown in FIG. 2C, a spiral can occur when the added material covers all, or substantially all, of a surface of the flexible, fibrous composite.

FIG. 2E shows a wave transformation. Parallel grains 130 of the added material are orthogonal to an axis of a fiber 115a of the flexible, fibrous composite, and coaxial with an axis of the other fiber 115b. The grain 130 of the added material is oriented at a 45° angle relative to its own boundary 135 and relative to the boundary 120 of the flexible, fibrous composite. The length of a boundary 135 of the added material 130 is shorter than the length of a boundary 120 of the flexible, fibrous composite. The fibers 115a and 115b of the flexible, fibrous composite are oriented at a 45° angle relative to its own boundary 120. The flexible, fibrous composite 110 is square; however, it need not be square in order to achieve a folding transformation. Conceptually, FIG. 2E builds upon FIG. 2A because it can be used to create two transformations like FIG. 2A, but on opposite sides of a flexible, fibrous composite. Although not illustrated, the added material can be oriented in different patterns on the first and sides of the flexible, fibrous composite, thereby creating even more unique structures.

Figure 2F:
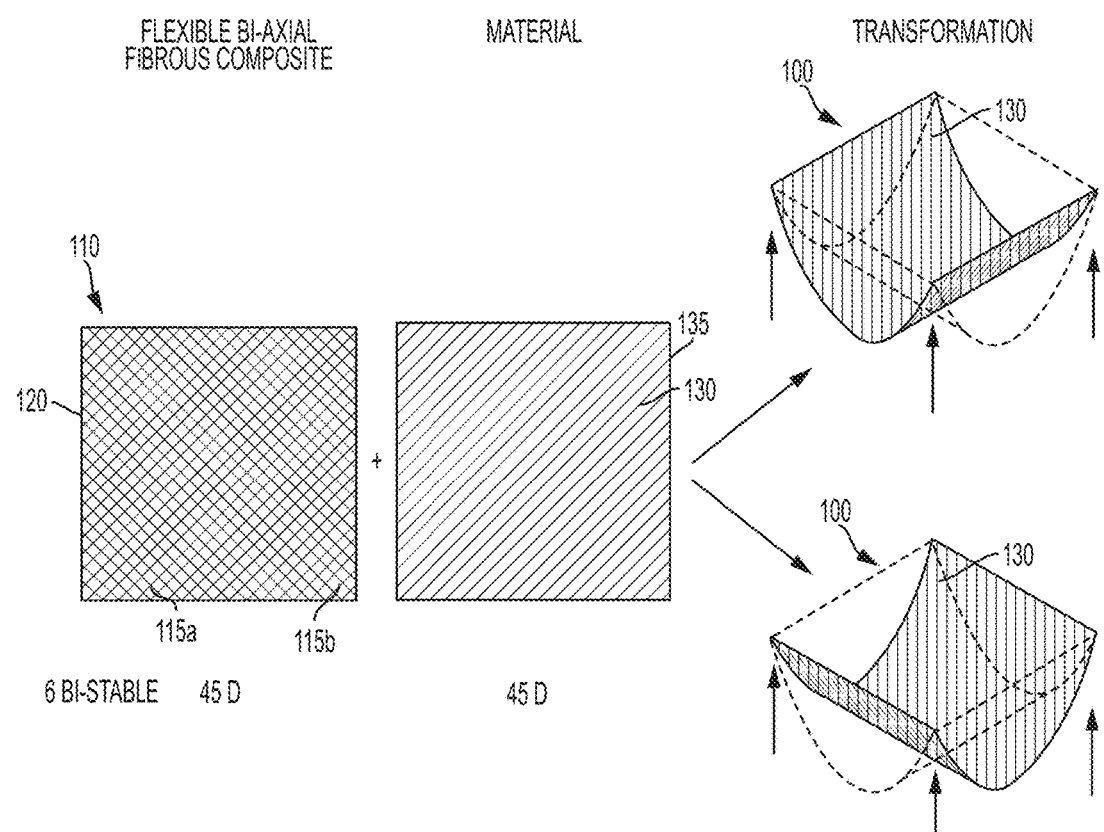

FIG. 2F shows a bi-stable configuration. Parallel grains 130 of the added material are orthogonal to an axis of a fiber 115a of the flexible, fibrous composite, and coaxial with an axis of the other fiber 115b. The grain 130 of the added material is oriented at a 45° angle relative to its own boundary 135 and relative to the boundary 120 of the flexible, fibrous composite. The length of a boundary 135 of the added material 130 is the same, or substantially the same, as the length of a boundary 120 of the flexible, fibrous composite. The fibers 115a and 115b of the flexible, fibrous composite are oriented at a 45° angle relative to its own boundary 120. In this particular example, the flexible, fibrous composite 110 is square; however, it need not be square in order to achieve a folding transformation. The grains 130 are applied so that they create equal forces in both directions, leading to a configuration that is bi-stable. The flexible, fibrous composite 110 is square; however, it need not be square in order to achieve a folding transformation. The bi-stable configuration is thus a subset of the curve configuration illustrated in FIG. 2B. For example, a curve can be created that curls from tip to tip, rather than edge to edge like in 2B. The configuration can be bi-stable if the flexible, fibrous composite is square, which results in equal forces in opposite directions.

Figure 2G:
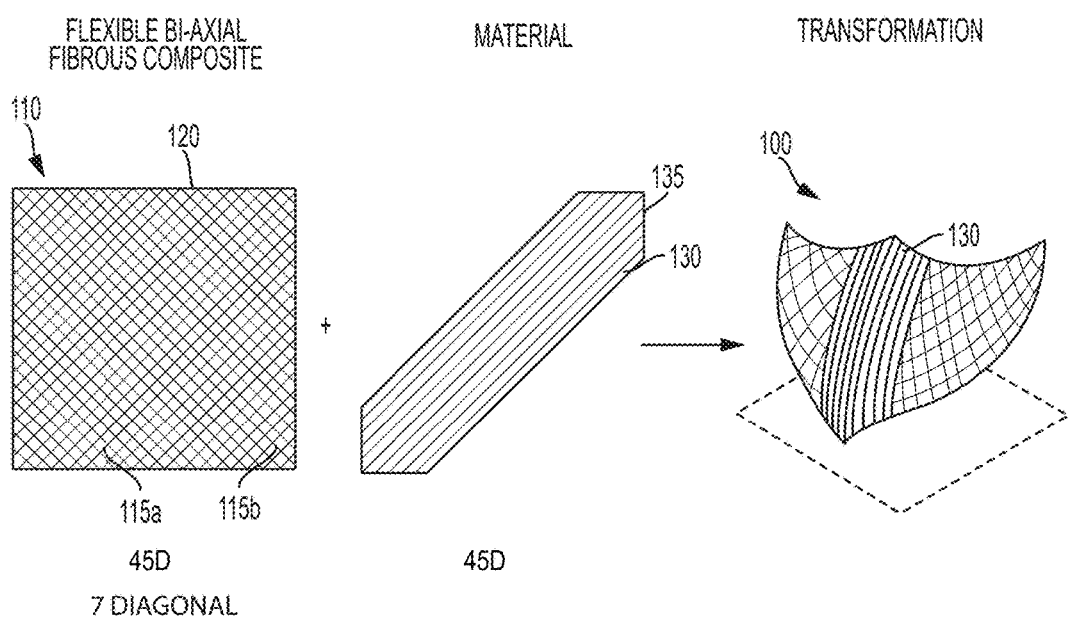

FIG. 2G shows a curve transformation. Parallel grains 130 of the added material are orthogonal to an axis of the fiber 115a of the flexible, flexible, fibrous composite, and coaxial with an axis of the other fiber 115b. The grain 130 of the added material is oriented at a 45° angle relative to its own boundary 135 and relative to the boundary 120 of the flexible, fibrous composite. The length of a boundary 135 of the added material 130 is shorter than the length of two different boundaries 120 of the flexible, fibrous composite. The fibers 115a and 115b of the flexible, fibrous composite are oriented at a 45° angle relative to its own boundary 120. In this particular example, the added material is applied across a diagonal of the flexible, fibrous composite 110, yielding the illustrated transformation.

Triaxial Weave Patterns and Oriented, Added Material

Unique orientations of the grain of the added material relative to the axis of the flexible, fibrous substrate can yield different transformation upon exposure to an external stimulus. Conceptually, two features define the relationship between a biaxial flexible, fibrous composite and the added material. First is the relationship of the grain pattern of the added material to an axis of a fiber of the flexible, fibrous composite. The triaxial weave pattern has fibers along three axes. Typically, the grain pattern of the added material will be coaxial with one of the axes, though it can be at an angle as well. Second is the orientation of the grain of the added material relative to a boundary of the flexible, fibrous composite. When the grain pattern of the added material is coaxial with one of the axes, the orientation can be 0°, 60°, or 120° relative to a boundary of the flexible, fibrous composite. Third is the length of a boundary of the added material in relation to the length of a boundary of the flexible, fibrous composite. The length of a boundary of the added material can be the same length as the length of a boundary of the flexible, fibrous composite. Alternatively, the length of a boundary of the added material can be shorter than a boundary condition of the flexible, fibrous composite. Fourth is the orientation of the fibers of the flexible, fibrous composite relative to a boundary of the flexible, fibrous composite. Typically, the fibers of the flexible, fibrous composite are angled at 60° and 120° relative to a boundary of the flexible, fibrous composite, though other angles are possible as well. As another optional fifth condition, the added material can be printed on opposing sides of the flexible, fibrous composite.

Figure 3A:
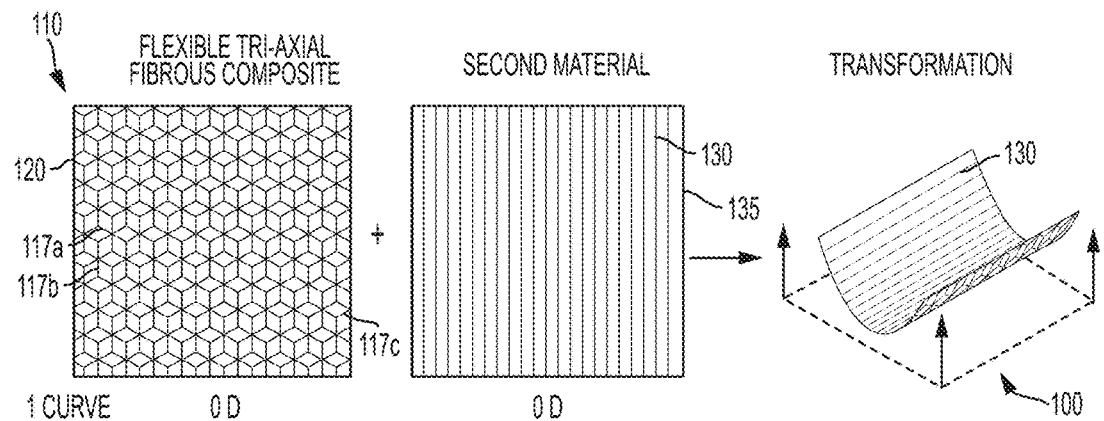
FIGS. 3A-C are illustrations of transformation on a triaxial fibrous composite: 3A) Curve; 3B) Curve; 3C) Curve.
Figure 3B:
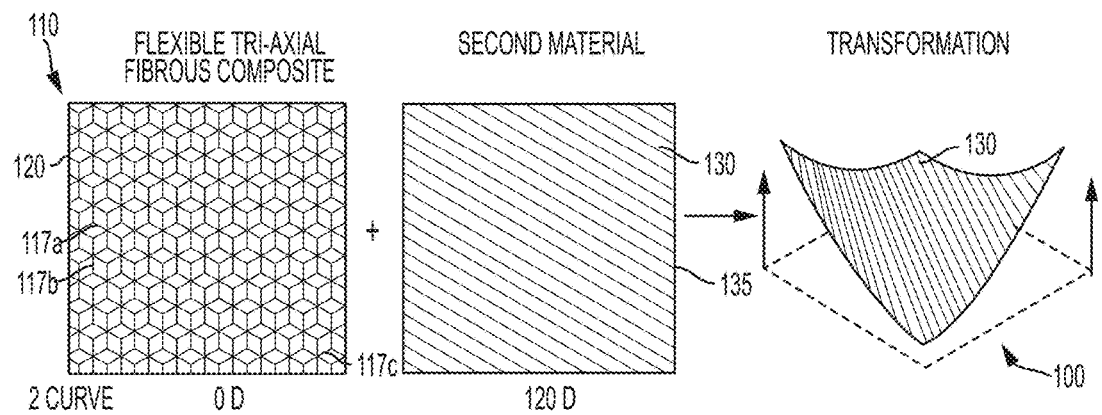
Figure 3C:
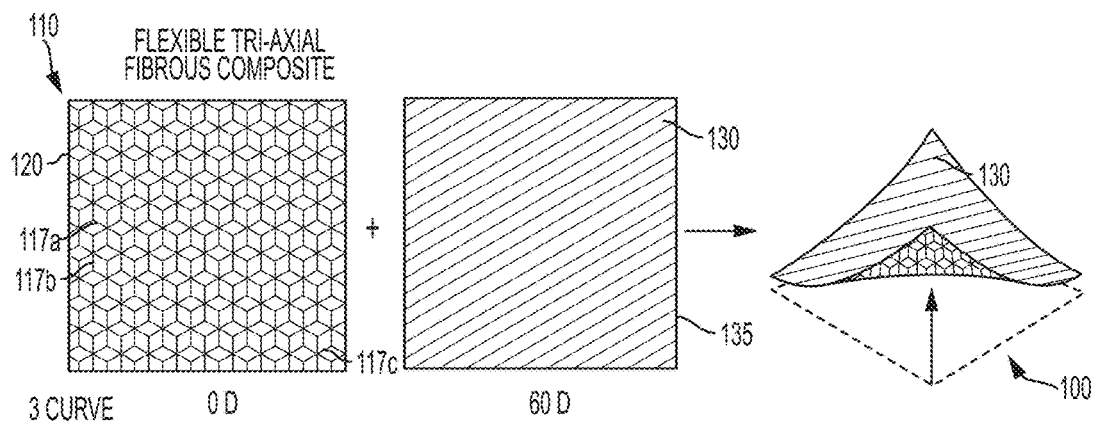

FIGS. 3A-C show three different types transformations that can be created. In general, FIGS. 3A-C show the relative orientation of a flexible, fibrous composite and the added material that is coupled to it. The relationship between the two features described in the preceding paragraph and the embodiments of FIGS. 3A-C are summarized in Table 2.

TABLE 2

Features of biaxial flexible, fibrous composite and added material illustrated in FIGS. 3A-C.

| FIG. and Transformation | 1. Relationship of the grain pattern of added material to an axis of a fiber of the flexible, fibrous composite | 2. Orientation of the grain of the added material relative to a boundary of the flexible, fibrous composite | 3. Length of a boundary of the added material in relation to the length of a boundary of the flexible, fibrous composite | 4. Orientation of the fibers of the flexible, fibrous composite relative to a boundary of the flexible, fibrous composite |
| --- | --- | --- | --- | --- |
| 3A: Curve | Orthogonal | 0° to a boundary | Same length | 60° and 120° |
| 3B: Curve | Orthogonal | 60° to a boundary | Same length | 60° and 120° |
| 3C: Curve | Orthogonal | 120° to a boundary | Same length | 60° and 120° |

FIGS. 3A-C show flexible fibrous composites having a triaxial weave pattern. In each of FIGS. 3A-C, the added material 130 is applied along an axis 117a,b,c of one of the fibers of the flexible, fibrous composite 110. Thus, each of the transformations in FIGS. 3A-C yields a similar transformation, though along a different axis.

Uniaxial Weave Patterns and Oriented, Added Material

Unique orientations of the grain of the added material relative to the axis of the flexible, fibrous substrate can yield different transformation upon exposure to an external stimulus. Conceptually, two features define the relationship between a biaxial flexible, fibrous composite and the added material. First is the orientation of the fibers of the flexible, fibrous composite to a boundary of the flexible, fibrous composite. Since the uniaxial weave pattern has fibers along one axis, typically the fibers are oriented orthogonally to a boundary of the flexible, fibrous composite. Second is the orientation of the grain of the added material relative to a boundary of the flexible, fibrous composite. The grain can be orthogonal to a boundary of the added material, parallel to a boundary of the added material, or oriented at an angle, such as a 45° angle, relative to a boundary of the added material. Third is the length of a boundary of the added material in relation to the length of a boundary of the flexible, fibrous composite. The length of a boundary of the added material can be the same length as the length of a boundary of the flexible, fibrous composite. Alternatively, the length of a boundary of the added material can be shorter than a boundary condition of the flexible, fibrous composite. Fourth is the orientation of the fibers of the flexible, fibrous composite relative to a boundary of the flexible, fibrous composite. Typically, the fibers of the flexible, fibrous composite are orthogonal to one boundary (and thus parallel to another) of the flexible, fibrous composite, though other angles are possible as well. As another optional fifth condition, the added material can be printed on opposing sides of the flexible, fibrous composite.

Figure 4A:
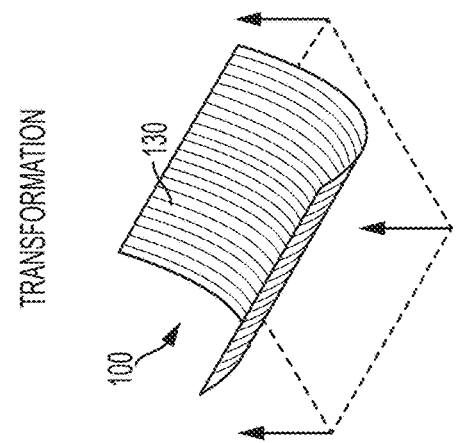
FIGS. 4A-C are illustrations of transformations on a uniaxial fibrous composite: 4A) Curve; 4B) Curve; 4C) Bi-stable transformation.
Figure 4A:
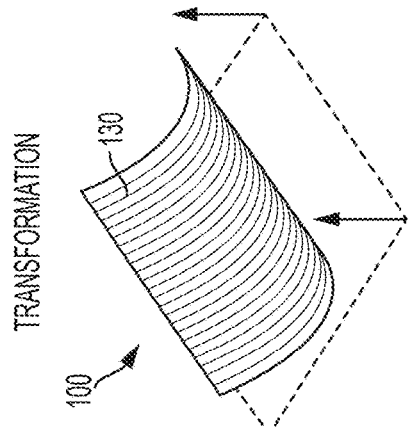
Figure 4B:
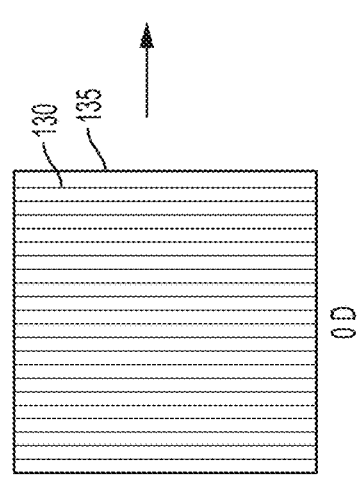
Figure 4B:
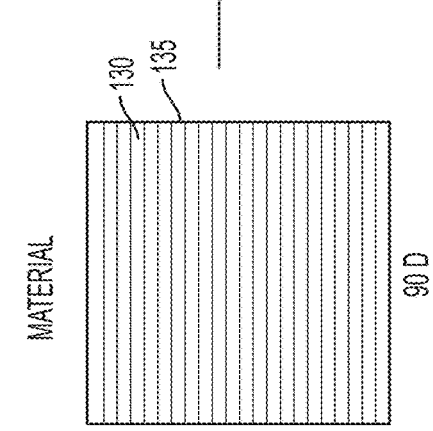
Figure 4C:
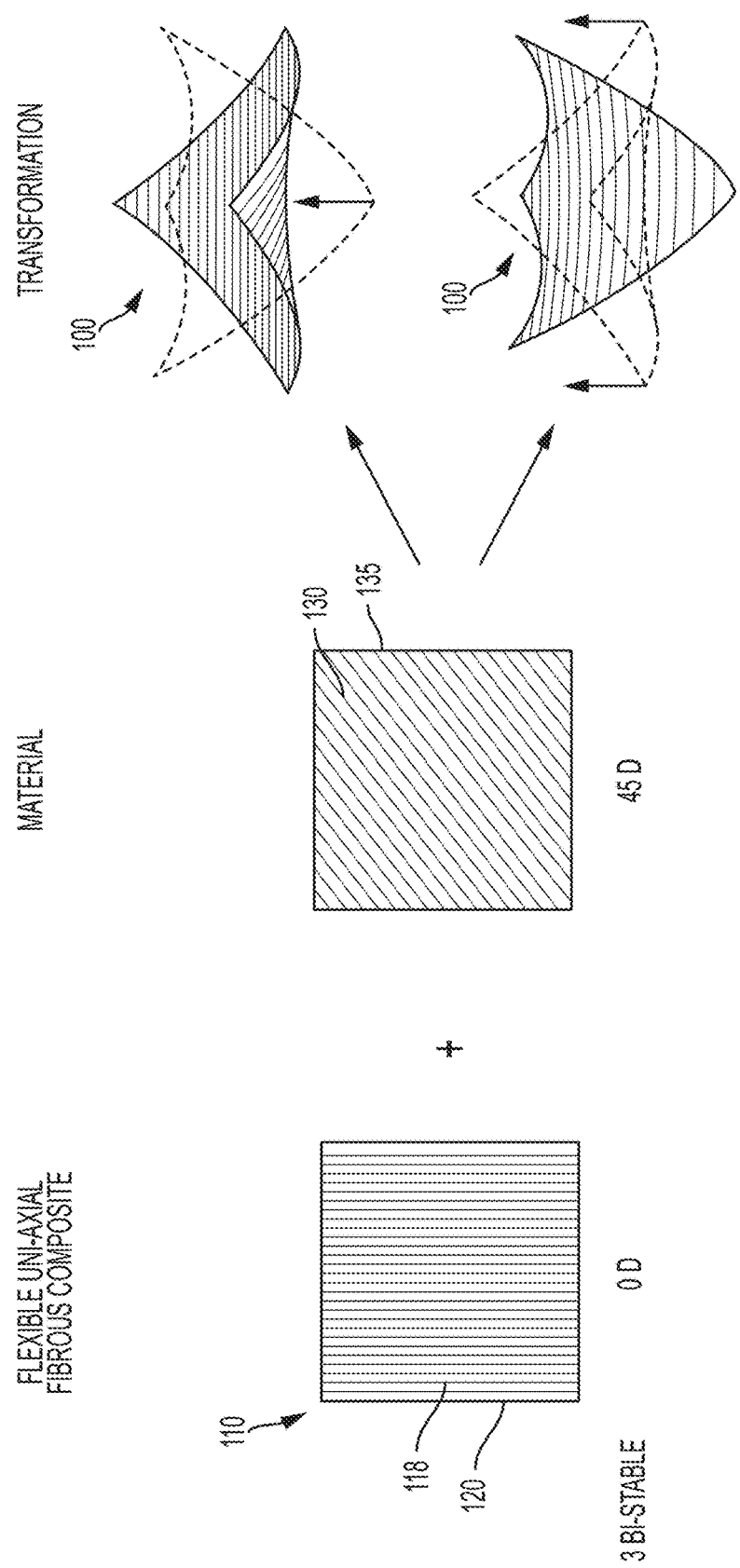

FIGS. 4A-C show three different types transformations that can be created. In general, FIGS. 4A-C show the relative orientation of a flexible, fibrous composite and the added material that is coupled to it. In each of FIGS. 4A-C, the added material 138 is applied along an axis 118 of the fibers of the flexible, fibrous composite 110. The relationship between the two features described in the preceding paragraph and the embodiments of FIGS. 4A-C are summarized in Table 3.

TABLE 3

Features of biaxial flexible, fibrous composite and added material illustrated in FIGS. 3A-C.

| FIG. and Transformation | 1. Orientation of the fibers of the flexible, fibrous composite relative to a boundary of the flexible, fibrous composite | 2. Orientation of the grain of the added material relative to a boundary of a flexible, fibrous composite | 3. Length of a boundary of the added material in relation to the length of a boundary of the flexible, fibrous composite | 4. Orientation of the fibers of the flexible, fibrous composite relative to a boundary of the flexible, fibrous composite |
|---|---|---|---|---|
| 4A: Curve | Orthogonal | 0° to a boundary | Same length | Orthogonal |
| 4B: Curve | Orthogonal | Orthogonal to a boundary | Same length | Orthogonal |
| 4C: Bi-stable | Orthogonal | 45° to a boundary | Same length | Orthogonal |

FIGS. 4A-C show flexible, fibrous composites having a uniaxial weave pattern. In each of FIGS. 4A-C, the added material 130 is applied to the flexible, fibrous composite. The flexible, uniaxial fibrous composite has fibers 118 oriented in parallel strips.

Flexible, Fibrous Composites

A variety of composites are suitable for use as a flexible, fibrous composite. One example is carbon fiber. Other examples include glass fiber, basalt fiber, liquid crystal polymers/fibers, and hybrids thereof. In general, the flexible, fibrous composites described herein have different performance characteristics. For example, some are more flexible than others, and some have more tensile strength than others. Generally, the weave patterns of the flexible, fibrous composite remain similar. The amount and rate of transformation can vary depending on the type of materials and the number of fibers. Thus, thickness and width can be adjusted to achieve the proper contractive force to cause a shape change in view of the coefficient of thermal expansion of the flexible, fibrous composite and the added material. The greater the difference in the coefficient of thermal expansion, the greater the transformation effect. Polymer melt shrinkage and changes in the coefficient of thermal expansion can also influence magnitude of the transformation. For example, if the flexible, fibrous composite is a nylon fiber composite, and the added material is nylon, the difference in the coefficient of thermal expansion is very small, and so is the transformation. As another example, a flexible, fibrous composite that is a hybrid of carbon fiber and high molecular weight polypropylene was used as a substrate for nylon as an added material. The resulting product provided a smaller angle of curvature (e.g., a smaller amount of transformation) compared to examples where the flexible, fibrous composite is carbon fiber alone. Thus, the general principles described herein remain applicable, but the magnitude of the transformation can vary depending on the materials chosen.

Added Materials

A variety of materials are suitable for use as an added material. The flexible, fibrous composite and the added materials typically have different rates of expansion and/or contraction in response to an external stimulus. As one particular example, the added material contracts more than the flexible, fibrous composite when cooled. Some examples of added materials include nylon, biaxially-oriented polyethylene terephthalate (BoPET, and available as MYLAR), polypropylene, and hydrogels.

A useful characteristic of a hydrogel is its percentage of expansion. For example, a hydrogel can expand 150% upon exposure to water. This expansion can cause the flexible, fibrous composite to curl such that the hydrogel is on the outside radius of curvature. Other important characteristics of a hydrogel are whether it is reversible (e.g., whether the hydrogel returns to its original shape), how long it takes to swell and then return to its original shape (e.g., dry out), and whether it deteriorates after repeated use. Examples of suitable swelling hydrogels are well-known in the art.

Another type of added material that is suitable for use in making a self-transforming structure is a UV-curable polymer. Examples of suitable polymers include those available from commercial 3D printing companies. These UV-curable polymers can be applied by 3D-printing. Typically, they are applied as uncured monomers, which are cured upon exposure to UV light.

Methods of Making Self-Transforming Structures

The added material is applied with its grains in an orientation relative to fibers of the flexible, fibrous composite in a variety of manners. In one embodiment, the added material is applied to the flexible, fibrous composite by additive manufacturing, also referred to as 3D printing. Additive manufacturing is a particularly useful technology because it can be used to apply the added material in a precisely oriented arrangement, thereby allowing the added material to be patterned relative to the weave pattern of the flexible, fibrous composite. For example, nylon can be applied by an additive manufacturing process. Hydrogels are typically applied by either an additive manufacturing or a lamination procedure. In order to apply the added material to the flexible, fibrous composite by 3D printing, a printing pattern for the added material is designed (e.g., the printing patterns illustrated in the figures, such as FIG. 2A-G, 3A-C, or 4A-C). The carbon fiber is then placed in the printer in the appropriate orientation. If necessary, the printer is calibrated. Printing parameters, such as the height and thickness of the printing, are specified. Finally, printing is commenced.

In some instances, the added material can be adhered to the flexible, fibrous composite by a lamination procedure, which can be a fast and consistent means for applying the added material to the flexible, fibrous composite. In some of the Examples below, the lamination was performed with a T-shirt press, though other means for lamination are known in the art. In order to apply the added material to the flexible, fibrous composite by lamination, the added material is placed onto the flexible, fibrous composite, and then lamination is commenced.

Additionally, reversible and non-reversible conditions for forming in a fabrication process versus and active transition for movement in a self-transforming structure can be encoded in the printing pattern. For example, a sheet of flexible, fibrous composite with secondary material can be designed to self-transform into a predicted shape after being subjected to an external stimulus. This eliminates the step of molding, tooling or other manual methods of forming composite structures.

External Stimuli

A variety of different external stimuli can be used to cause shape transformation. Typically, these external stimuli can also cause expansion or contraction in response to temperature changes. For example, lasers can be used to apply localized heating. As another example, an infrared heat lamp can be used to provide heat. Electrical resistive heating can also be used to provide heating, such as through the use of a Nichrome wire or a flexible heat pad.

As another example, electroactive polymers can be used. Electroactive polymers can exhibit a change in size or shape in response to an electric field.

As another example, ultraviolet (UV) radiation can be used to cure UV-curable polymers, which typically contact during cross-linking.

EXEMPLIFICATION

Example 1

Width of Added Material and Angle of Self-Transformation

Nylon 618 was applied to a Carbitex A324 flexible, fibrous composite according to the pattern of FIG. 2A.

Table 4 lists measured angles of transformation that were observed using different widths for the Nylon grains. The angles were measured at room temperature.

TABLE 4

Relationship between width (b) of grains of the added material and angle of transformation (a).

| Width (b) | 3 mm | 9 mm | 18 mm | 21 mm |
|---|---|---|---|---|
| Angle (a) | 15.00° | 44.33° | 63.67° | 97.67° |

As shown in Table 4, applying grains of the Nylon having different widths can result in different angles of transformation upon exposure to an external stimulus.

Example 2

Lamination Temperature and Grain Width

Figure 5:
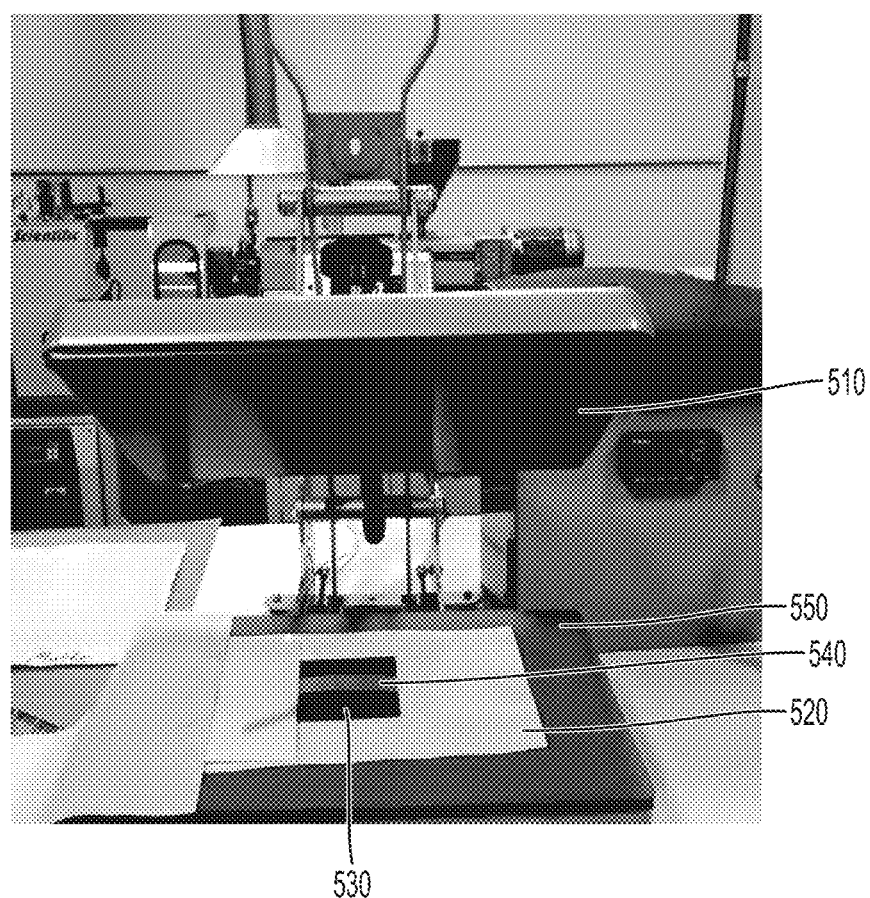
FIG. 5 is an annotated photograph of an experimental setup for making a self-transforming structure.

FIG. 5 is an annotated photograph of the experimental setup. Three 4"×4" A324 carbon fiber samples (Carbitex LLC, Kennewick, Wash., USA) were laminated with nylon strips having three different widths. The Carbitex A324 product is biaxial and has fibers that intersect at 90 degree angles. The weave pattern name is a 2×2 twill, where 2×2 refers to two over and two under in both directions of the fiber bundles. Strips one and four: 1 inch wide; strips two and five: 2 inches wide; strips three and six: 3 inches wide. Each of the three strips was applied to the A324 carbon fiber in accordance with the pattern shown in FIG. 2D.

Laminating temperatures: 280° F. and 400° F.

Laminating pressure: one inch nylon strip: 162.5 psi; two inch nylon strip: 81 psi; three inch nylon strip: 54 psi.

Lamination time: 300 seconds

The laminating was conducted in a T-shirt press 500 (Stahl's Hotronix Thermal Transfer Press, Model #STX11) having a heated platen 510. The T-shirt press was further instrumented in order to accurately apply pressure with an Omega digital read out Model DP25B-S-A and a 0-500 lb LeBow Load cell model number 3132-101. To calculate the pressure, the force of the T-shirt press was divided by the area of the lamination area of the subtracted to be bonded. Release paper 520 is placed on both sides of the carbon fiber 530 and nylon 540 in order to facilitate release from the pressing machine. Silicone 550 was used as a base.

Figure 6A:
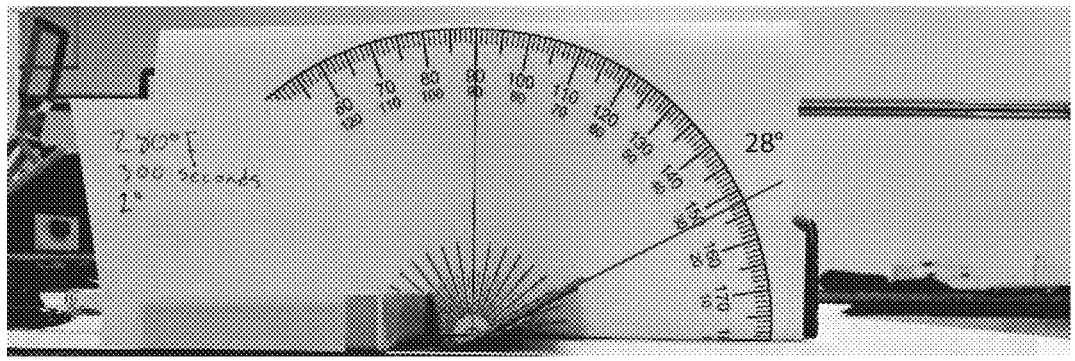
FIGS. 6A-C are photographs of observed transformation for one inch, two inch, and three inch nylon strips laminated onto a four inch-by-four inch flexible carbon fiber sample at 280° F. for 300 seconds.
Figure 6B:
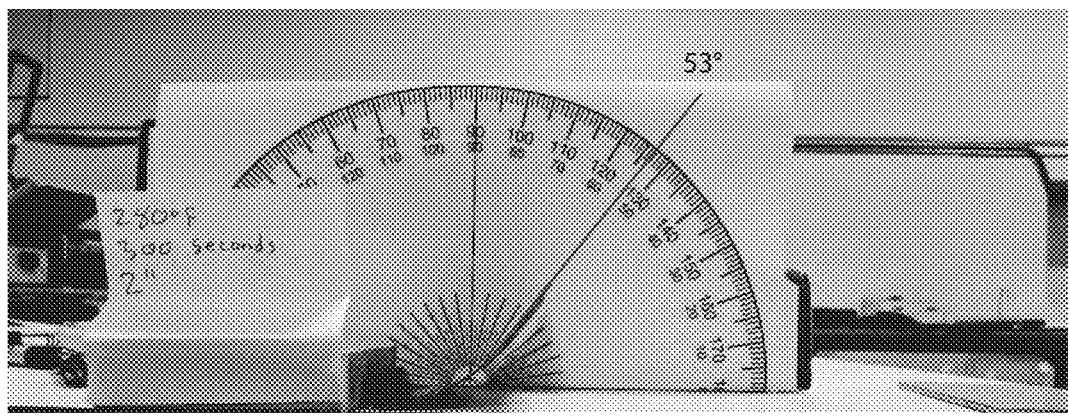
Figure 6C:
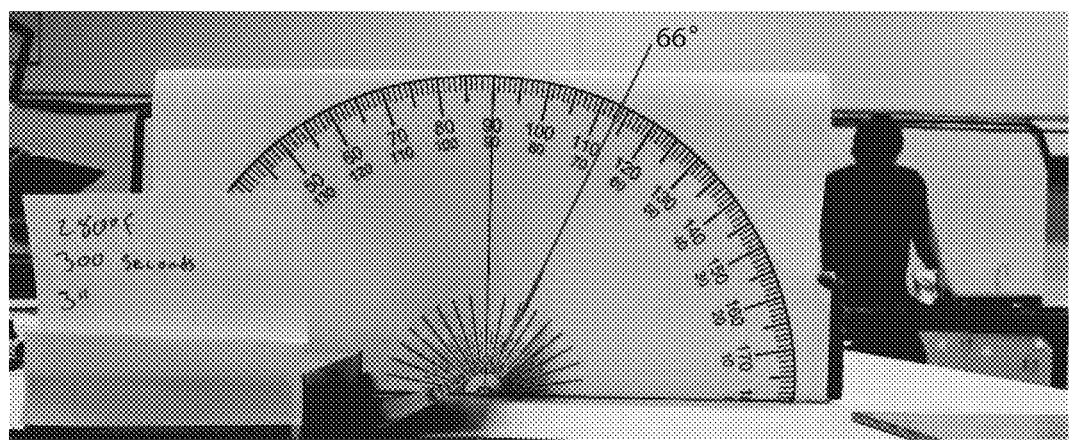
Figure 7A:
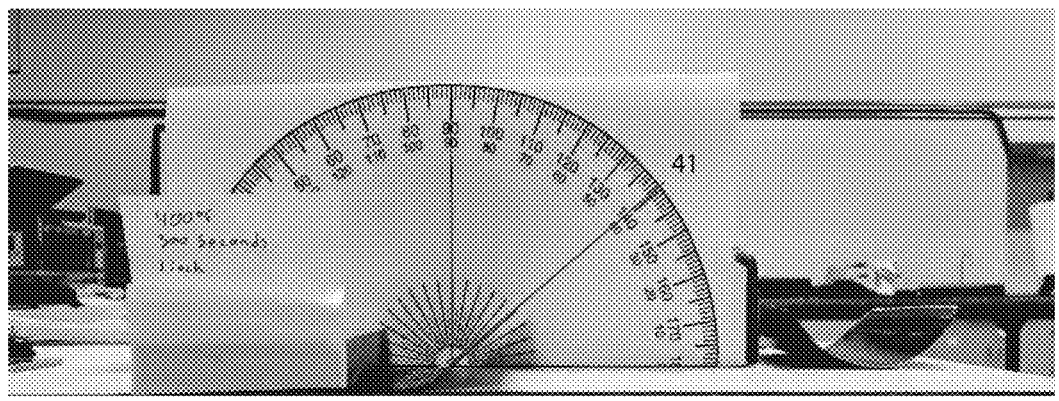
FIGS. 7A-C are photographs of observed transformation for one inch, two inch, and three inch nylon strips laminated onto a four inch-by-four inch flexible carbon fiber sample at 400° F. for 300 seconds.
Figure 7B:
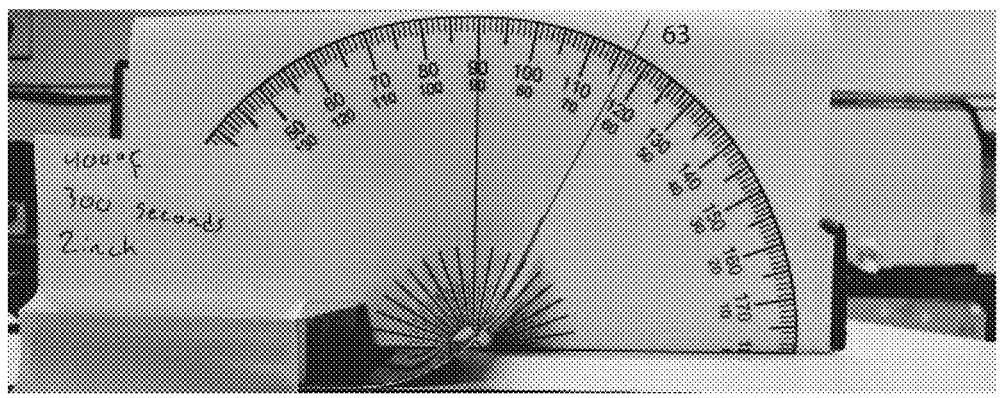
Figure 7C:
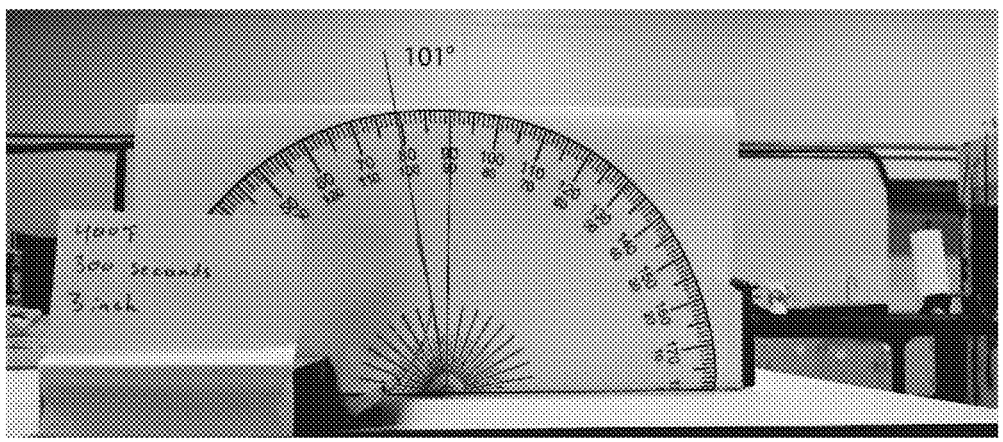

FIGS. 6A-C and 7A-C are photographs showing the results of the experiment. FIGS. 6A-C show the transformation of the 1 inch, 2 inch, and 3 inch nylon strips at 280° F. FIGS. 7A-C show the transformation of the 1 inch, 2 inch, and 3 inch nylon strips at 400° F. FIGS. 7A-C are also referred to as 25% Strip, 50% Strip, and 75% Strip, respectively, which refers to the percentage of the width of the sample having Nylon across it. For a 4"×4" square, a 1" wide strip is referred to as 25% Strip; a 2" wide strip is referred to as 50% Strip; and a 3" wide strip is referred to as 75% Strip. The results are shown in Table 5:

TABLE 5

| | Observed transformation | | | |
|---|---|---|---|---|
| | Temperature (° F.) | Strip width (inches) | Pressing duration (seconds) | Curvature (degrees) |
| Strip 1 | 280 | 1 | 300 | 28 |
| Strip 2 | 280 | 2 | 300 | 53 |
| Strip 3 | 280 | 3 | 300 | 66 |
| Strip 4 | 400 | 1 | 300 | 41 |
| Strip 5 | 400 | 2 | 300 | 63 |
| Strip 6 | 400 | 3 | 300 | 101 |

Observations: 1) Lamination pressure impacts nylon wet out to Carbitex A324. As the shear force increases during the lamination process, low lamination pressure or low wet out of the bonded surface can reduce the amount bonded surface area, thereby allowing the lamination to decouple. Thus, sufficient lamination pressure is necessary to ensure adequate bonding between the nylon and carbon fiber. The minimum lamination pressure depends on the viscosity of the added material that is being bonded. As tested, a pressure of 54 psi appears sufficient to ensure appropriate lamination. 2) Angle of curl depends on lamination temperature; angle of curl depends on lamination width. 3) Zero degree angle of curl is equal to the lamination temperature. If the lamination occurs at ambient temperature, the lamination is stable and no curling will occur when the temperature remains at ambient temperature. If the ambient temperature lamination is subsequently heated, the expansion differential will cause a curl. Likewise, when the flexible, fibrous composite is laminated at elevated temperatures, as shown in Table 4, the contraction differential of the flexible, fibrous composite and the added material will cause curling at ambient temperature. Similarly, zero degree curling will be occur at the lamination temperature. For example, if lamination occurs at 280° F., there will be 28 degree curvature at ambient temperature. However, if reheated to 280° F., the angle of curvature will be zero.

Without wishing to be bound by theory, it is believed that change in length can be modeled according to Formula (I):

$$\Delta L = \alpha * L_0 * (T - T_0) \quad (I)$$

α=coefficient of thermal expansion (CTE)
$L_0$=original length (e.g., of nylon)
$T_0$=initial temperature
T=temperature For nylon, α is between approximately $4 \times 10^{-5}$ and $5.5 \times 10^{-5}$ in/in/° F.

Figure 8A:
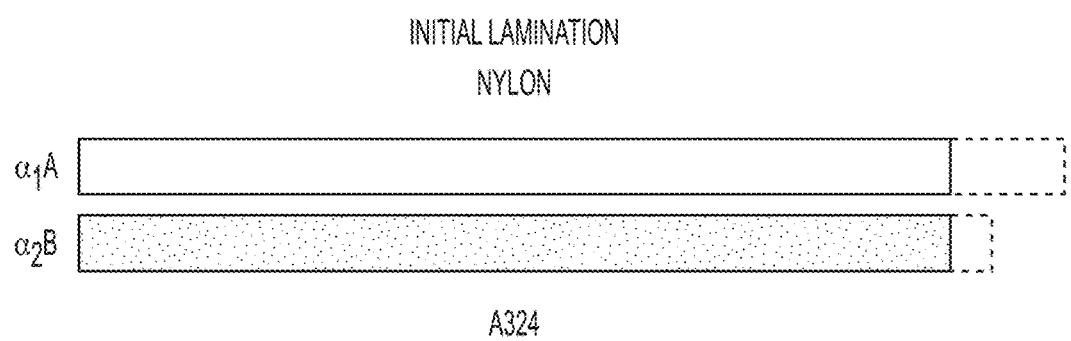
FIGS. 8A and 8B are illustrations showing nylon coupled to a carbon fiber.
Figure 8B:
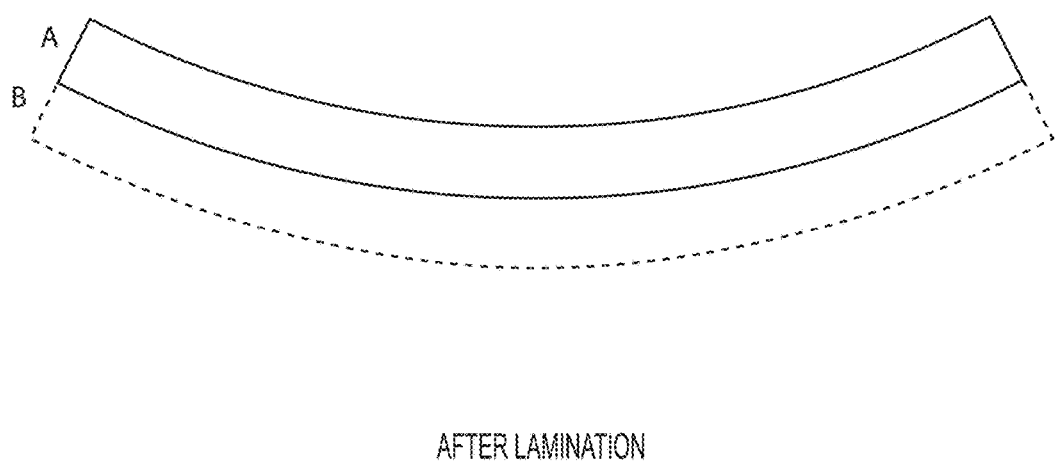

FIGS. 8A and 8B are illustrations showing nylon coupled to a carbon fiber. FIG. 8A shows nylon adjacent to carbon fiber prior to lamination. FIG. 8B shows nylon coupled to carbon fiber after lamination and the shape transformation that has occurred. Table 6 describes calculated changes in Nylon based on the coefficient of thermal expansion a that temperature differential.

TABLE 6

Calculated changes in length of Nylon based on the coefficient of thermal expansion at that temperature differential

| $L_0$ (in) | CTE (in/in/° F.) | $T_0$ (° F.) | T (° F.) | L (in) |
|---|---|---|---|---|
| 1 | 4.00E-05 | 75 | 280 | 0.0082 |
| 2 | 4.00E-05 | 75 | 280 | 0.0164 |
| 3 | 4.00E-05 | 75 | 280 | 0.0246 |
| 1 | 4.00E-05 | 75 | 400 | 0.013 |
| 2 | 4.00E-05 | 75 | 400 | 0.026 |
| 3 | 4.00E-05 | 75 | 400 | 0.039 |

Example 3

Self-Transformation in Response to Temperature Change

Figure 9:
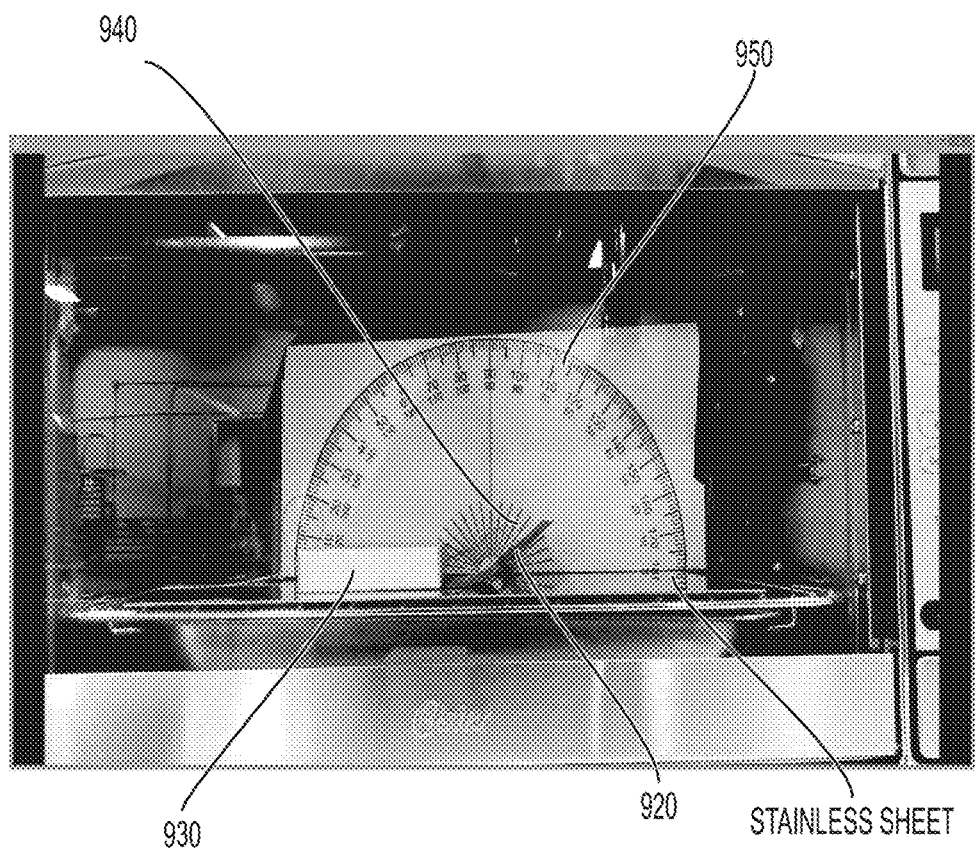
FIG. 9 is an annotated photograph of an experimental setup for observing temperature-dependent self-transformation.
Figure 10A:
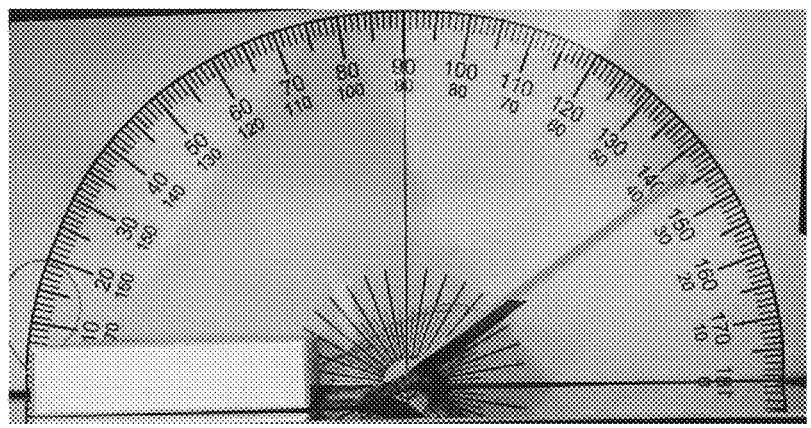
FIGS. 10A-I are a series of photographs showing the transformation over time (mm:ss). A) Time=0:00, Temperature=83° F.; B) Time=1:00, Temperature=119° F.; C) Time=2:00, Temperature=150° F.; D) Time=3:00, Temperature=187° F.; E) Time=4:00, Temperature=221° F.; F) Time=5:00, Temperature=240° F.; G) Time=7:00, Temperature=246° F.; H) Time=10:12, Temperature=261° F.; I) Time=10:32, Temperature=273° F.
Figure 10B:
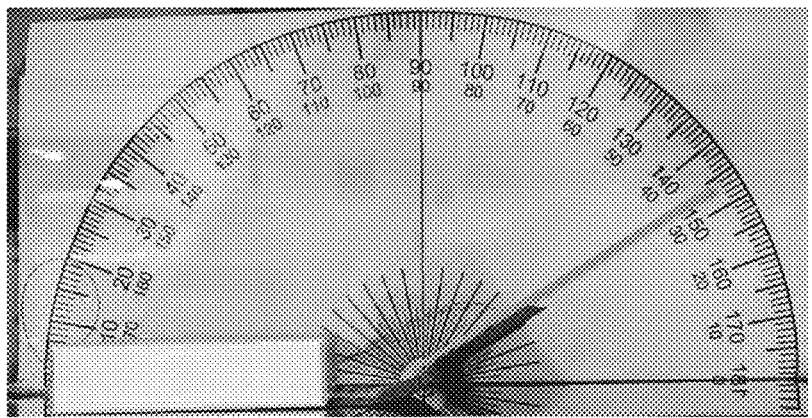
Figure 10C:
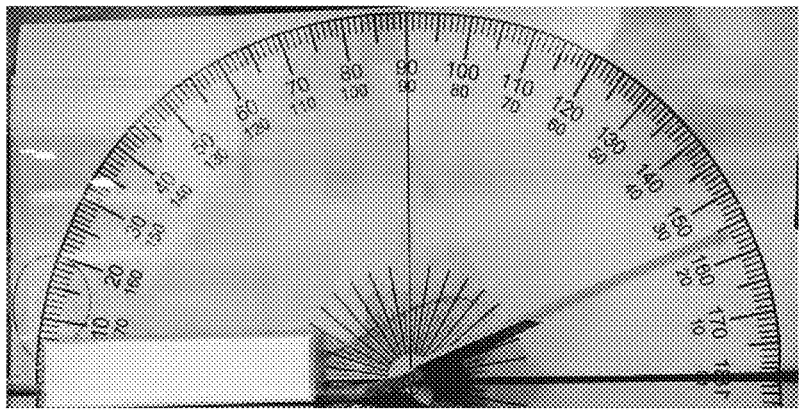
Figure 10D:
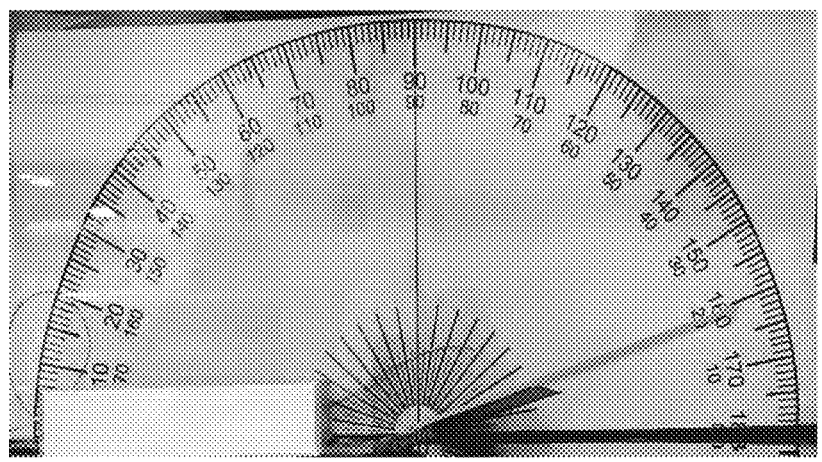
Figure 10E:
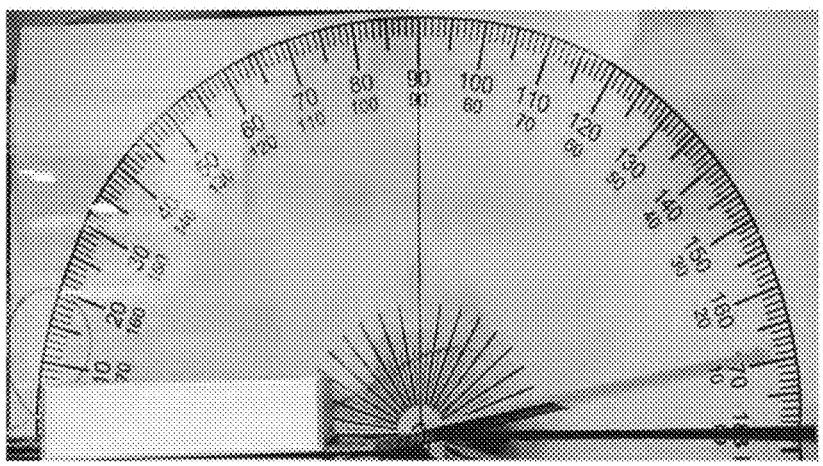
Figure 10F:
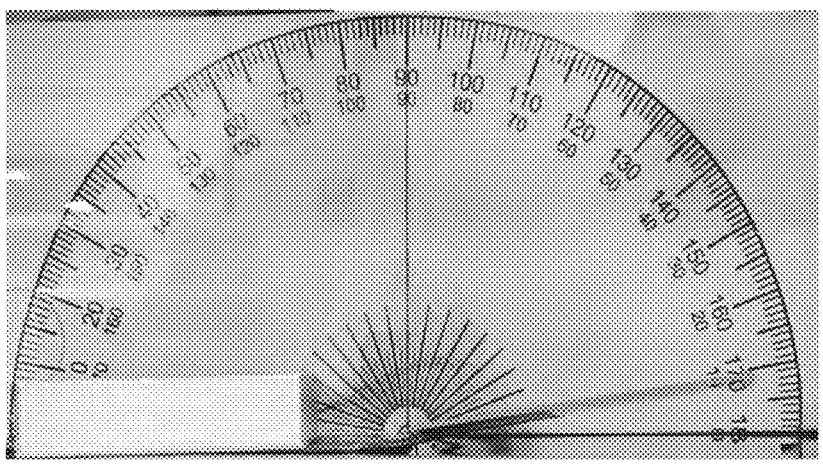
Figure 10G:
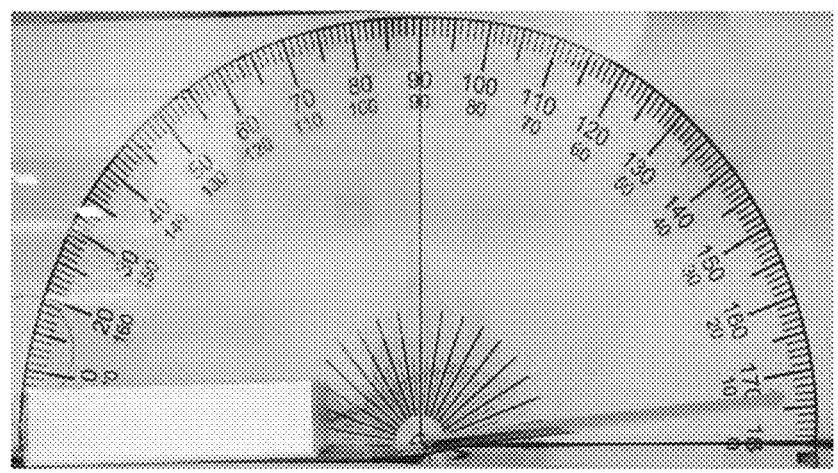
Figure 10H:
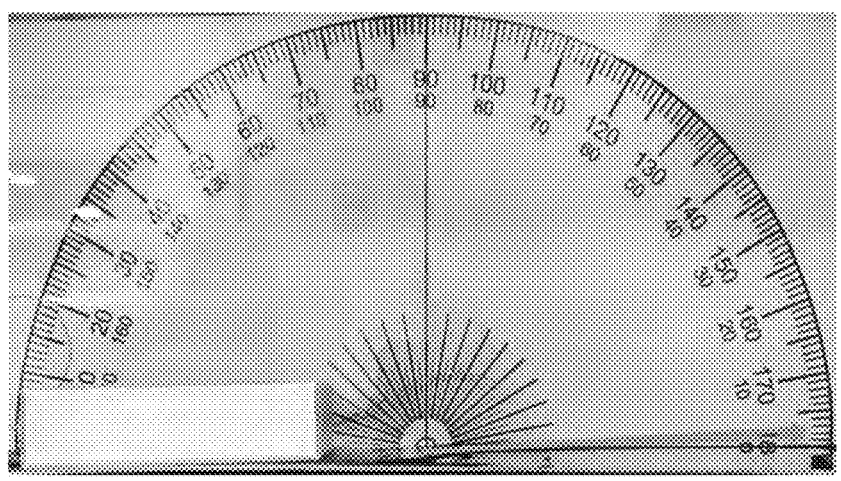
Figure 10I:
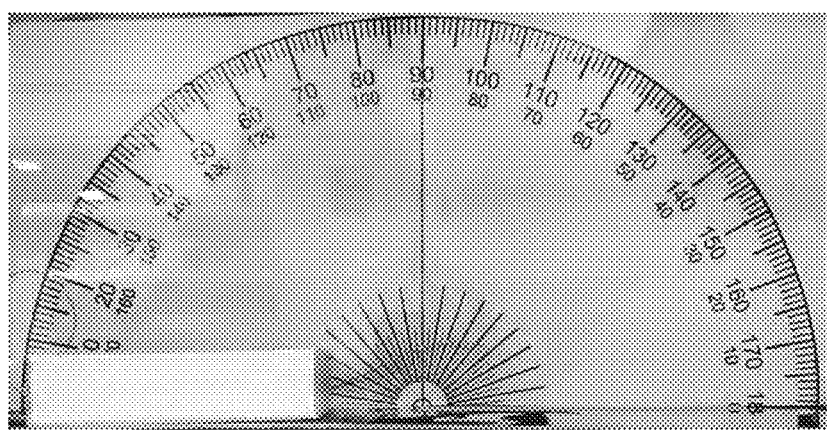

FIG. 9 is an annotated photograph of an experimental setup for measuring self-transformation in response to temperature changes. In both FIG. 9 and FIGS. 10A-I, nylon was laminated onto carbon fiber according to the pattern illustrated in FIG. 2D.

Figure 11:
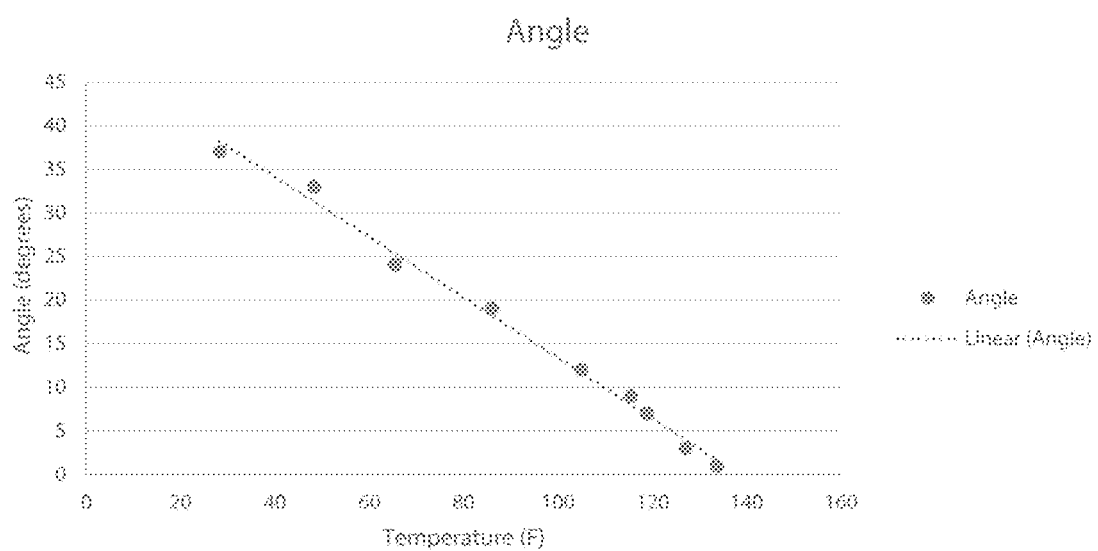
FIG. 11 is a graph showing the change in the angle of self-transformation as temperature increases.

An Oster convection oven 910 (Model No. TSSTT-VDGXL) was used to heat the self-transforming structure 920. An aluminum block 930 was used to hold down one end of the self-transforming structure 920. A fine wire thermocouple 940 was used to measure temperature, and a protractor 950 was used to measure the angle of transformation. Temperature values were measured during heating to correlate the angle of movement to temperature increase. The results are show in FIGS. 10A-I, which is a series of time-lapse photographs. The measured values are provided in Table 7, and FIG. 11 is a graph showing the measured angle vs. temperature change (y=−0.3461x+47.982; $R^2$=0.9931).

TABLE 7

Measured angles of transformation

| Time (mm:ss) | Temperature (° F.) | Angle (°) | Corresponding FIG. |
|---|---|---|---|
| 0:00 | 83 | 37 | 10A |
| 1:00 | 119 | 33 | 10B |
| 2:00 | 150 | 24 | 10C |
| 3:00 | 187 | 19 | 10D |
| 4:00 | 221 | 12 | 10E |
| 5:00 | 240 | 9 | 10F |
| 7:00 | 246 | 7 | 10G |
| 10:12 | 261 | 3 | 10H |
| 10:32 | 273 | 1 | 10I |

Example 4

Twisting and Folding Self-Transforming Structures

A twisting and a folding transformation are shown in FIGS. 12A-B and 13A-B.

Figure 12A:
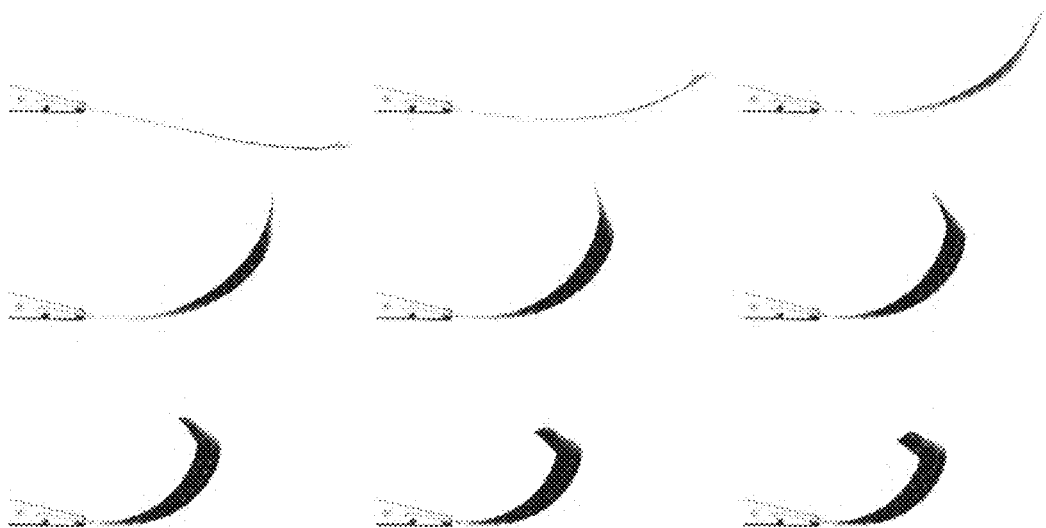
FIG. 12A is a series of time-lapsed photographs showing a twisting transformation.
Figure 12B:
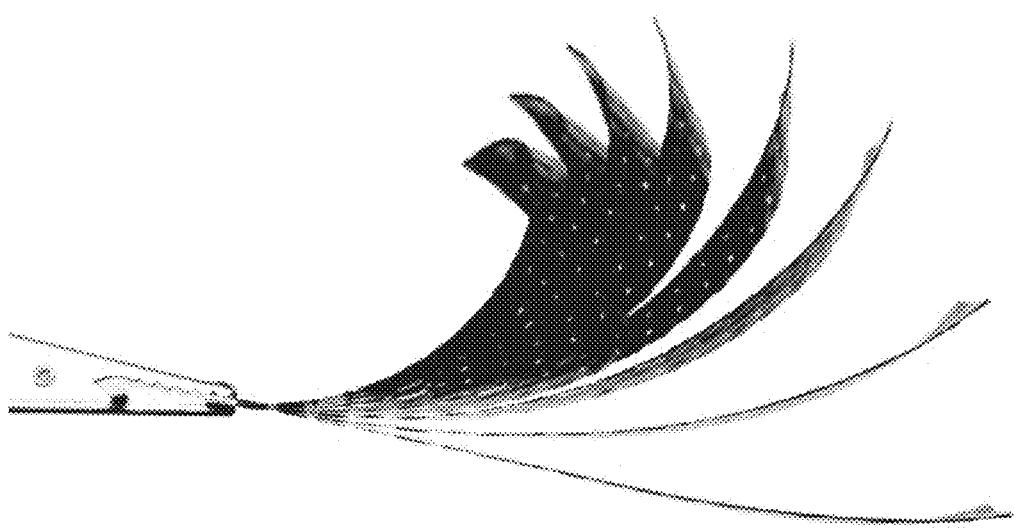
FIG. 12B shows superimposed photos of a time-lapsed twisting transformation.

FIG. 12A is a series of time-lapsed photographs showing a twisting transformation. FIG. 12B shows superimposed photos of a time-lapsed twisting transformation. In this prototype, the printed nylon filament was extruded onto Carbitex A324 flexible, fibrous composite at a temperature of 220° C. to 240° C. while the heated bed temperature was at 50° C. The width of the printed grain pattern was approximately 20 mm, printed in a similar pattern with relation to the grain of the flexible carbon fiber as shown in FIG. 2C. The first layer height was printed at 0.6 mm above the carbon surface. The second layer was printed at 0.3 mm above the first. The printed grains were spaced at 0.4 mm offset from one another. After printing, the prototype was heated with ambient heat from a heat bed set to 400° C. for about 10 seconds.

Figure 13A:
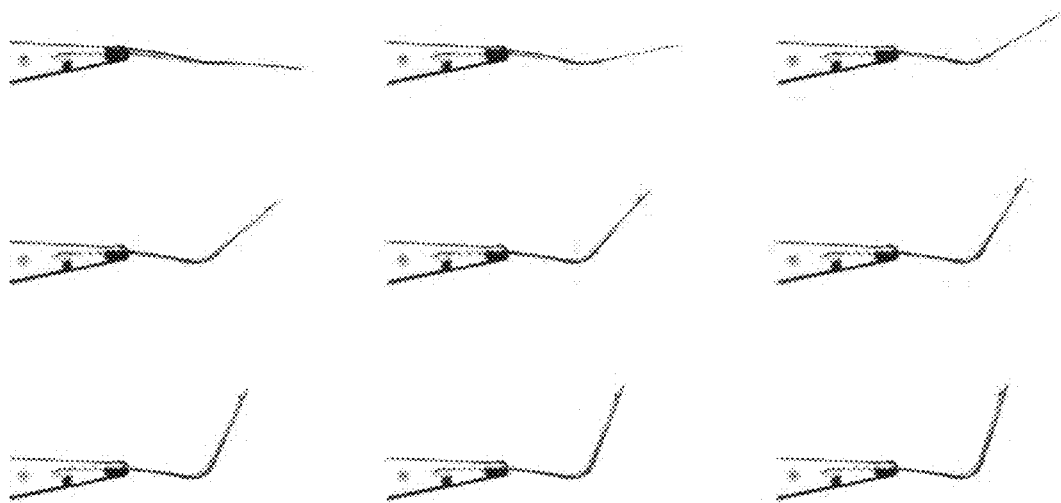
FIG. 13A is a series of time-lapsed photographs showing a folding transformation.
Figure 13B:
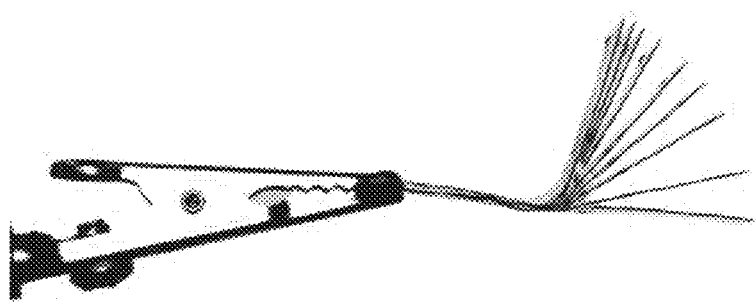
FIG. 13B shows superimposed photos of a time-lapsed folding transformation.

FIG. 13A is a series of time-lapsed photographs showing a folding transformation. FIG. 13B shows superimposed photos of a time-lapsed folding transformation. In this prototype, the printed nylon filament was extruded onto Carbitex A324 flexible, fibrous composite at a temperature of 220° C. to 240° C. while the heated bed temperature was at 50° C. The width of the printed grain pattern was approximately 20 mm, printed in a similar pattern with relation to the grain of the flexible carbon fiber as shown in FIG. 2A. The first layer height was printed at 0.6 mm above the carbon surface. The second layer was printed at 0.3 mm above the first. The printed grains were spaced at 0.4 mm offset from one another. After printing, the prototype was heated with ambient heat from a heat bed set to 400° C. for about 10 seconds.

Example 5

Use of Self-Transforming Structure in an Airplane Engine

Figure 14:
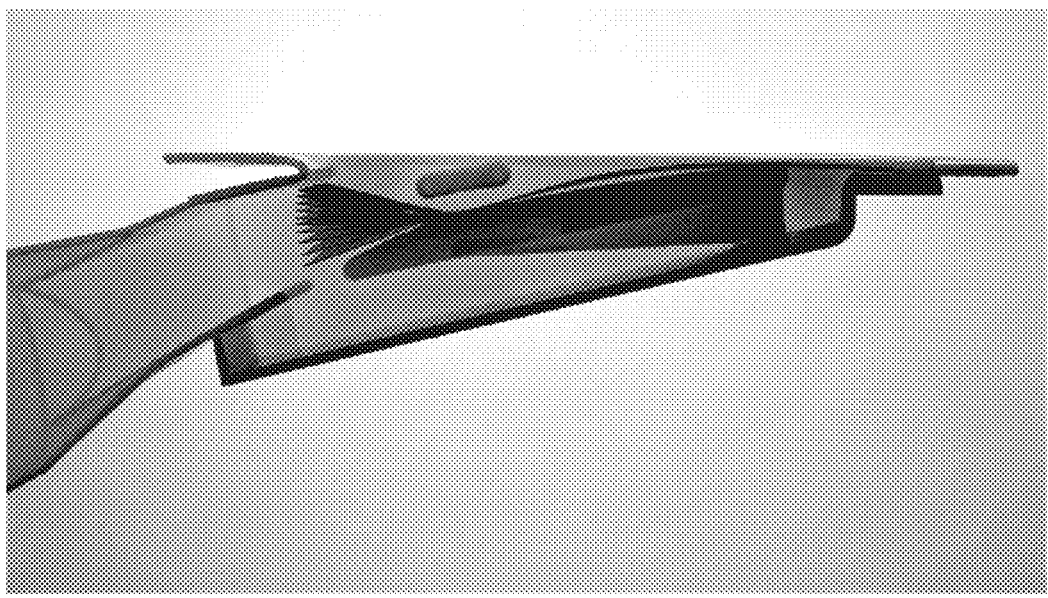
FIG. 14 is a time-lapse photograph showing the self-transformation of programmable carbon fiber within a jet engine air inlet. The dynamic carbon fiber regulates the amount of airflow for active engine cooling.

FIG. 14 is a series of time-lapsed photographs showing a folding transformation superimposed on top of one another. In this prototype, the printed nylon filament was extruded at a temperature of 220° C. to 240° C. while the heated bed temperature was at 50° C. The width of the printed grain pattern was approximately 20 mm, printed in a similar pattern with relation to the grain of the flexible carbon fiber as shown in FIG. 2A. The first layer height was printed at 0.6 mm above the carbon surface. The second layer was printed at 0.3 mm above the first. The printed grains were spaced at 0.4 mm offset from one another. After printing, the prototype was heated with ambient heat from a heat bed set to 400° C. for ~10 seconds. This embodiment can be used to provide adaptive control of fluid flow in response to temperature changes.

Example 6

Figure 15:
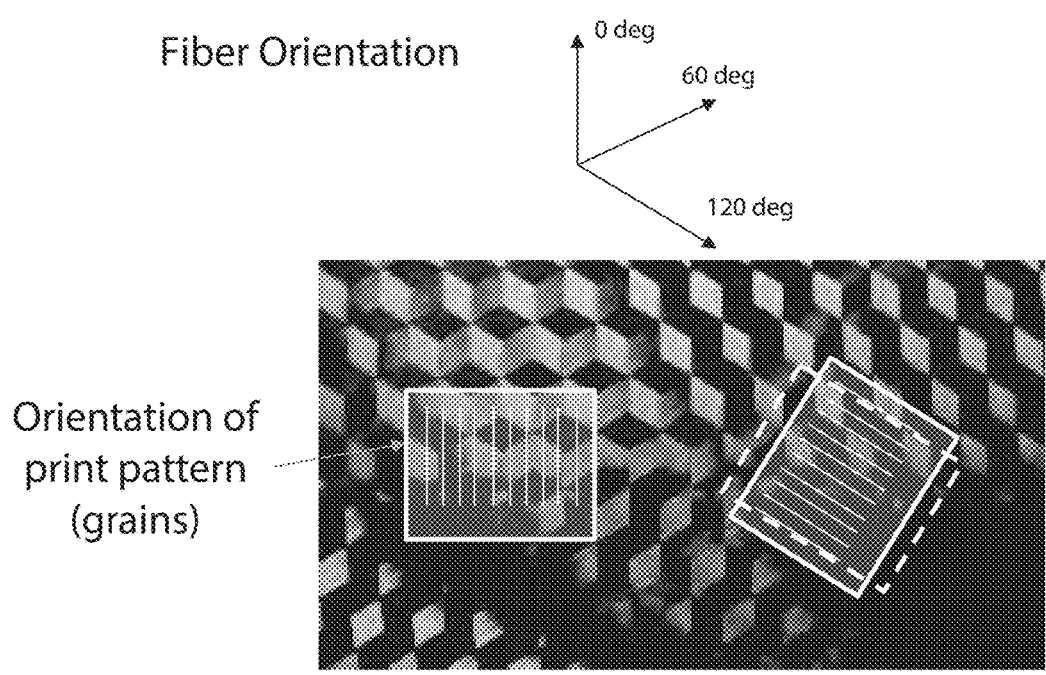
FIG. 15 is an example of a triaxial weave with 22 mm wide strips of fiber woven in 0 degree, +60 degree and −60 degree orientation. The laminated sheet on top of the weave can be placed in-line with the fiber orientation at 0°, 120°, or 60° to achieve a 1-curve, 2-curve, or 3-curve type behavior, respectively.

Self-Transforming Structure Formed of Flexible, Fibrous Composite Having a Triaxial Weave FIG. 15 is an example of a triaxial weave of T700 carbon fiber (Gernitex; Product No. TXD-20-T700-120) with 22 mm wide strips of fiber woven in 0 degree, +60 degree and −60 degree orientation. The Gernitex T700 carbon fiber has an areal density of 120 grams per square meter areal. The laminated sheet on top of the weave can be placed in-line with the fiber orientation at 0, 120 or 60 degree to achieve a curve, 2 curve, or 3 curve type behavior respectively.

Example 7

Figure 16:
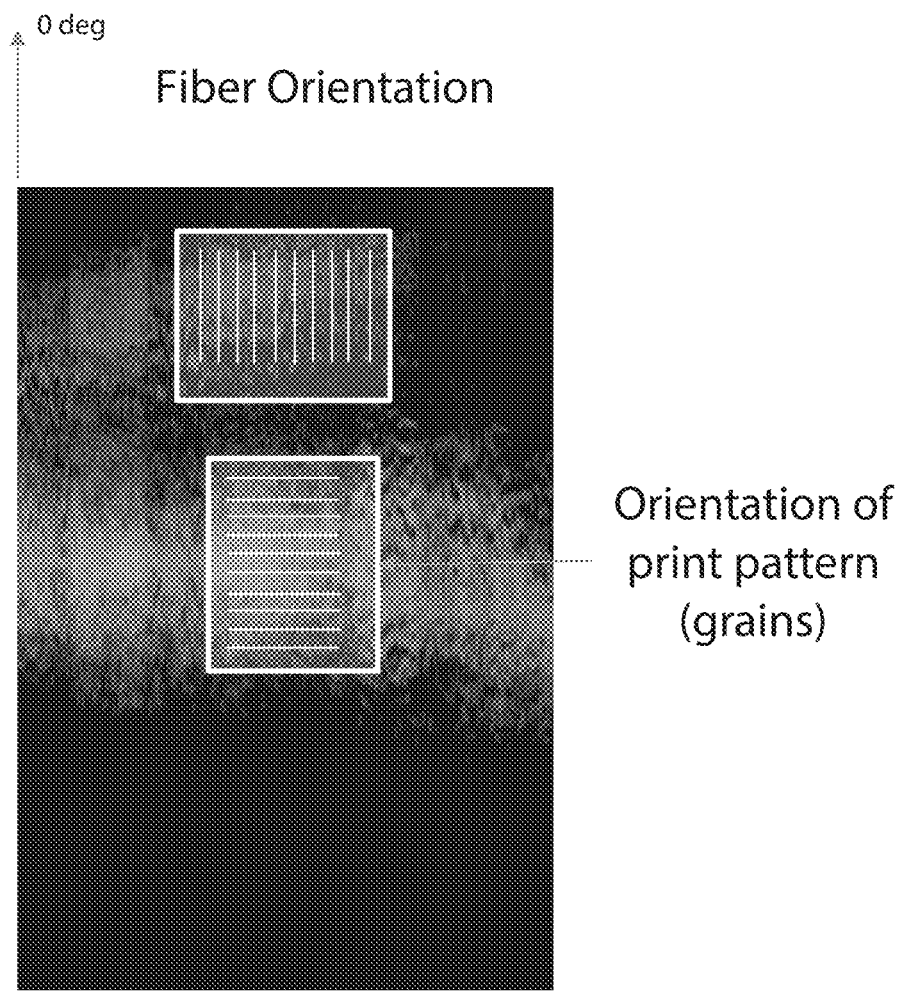
FIG. 16 is an example of a uniaxial weave orientation. The print pattern on top of the weave can be placed in-line with the fiber orientation or at 90° to achieve a 1-fold or 2-fold type behavior, respectively.

Self-Transforming Structure Formed of Flexible, Fibrous Composite Having a Uniaxial Weave FIG. 16 is an example of a uniaxial weave orientation of carbon fiber. The pattern on top of the weave can be placed in-line with the fiber (top) or orientated at 90° relative to the fiber orientation (bottom) to achieve a 1-curve or 2-curve type behavior, respectively.

Example 8

Self-Transforming Structures with Triaxial Flexible, Fibrous Composite

Figure 17A:
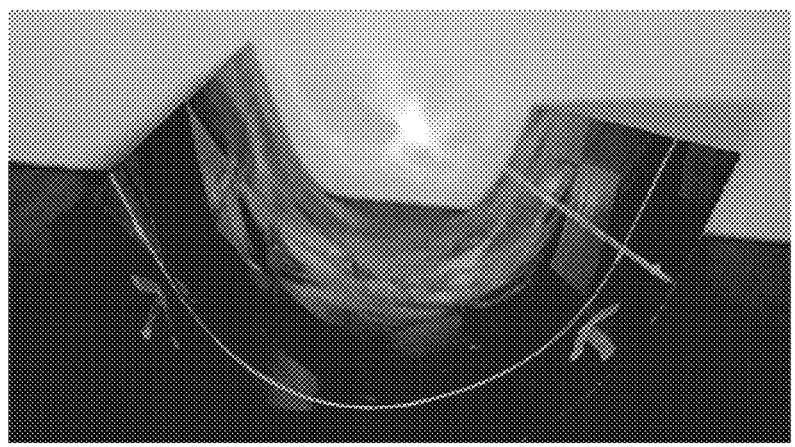
FIGS. 17A and 17B are photographs of self-transforming structures made using a triaxial flexible, fibrous composite. The grain direction of the added material is indicated with arrows and is patterned as illustrated in FIG. 3A.
Figure 17B:

FIGS. 17A and 17B are photographs of a self-transforming structures. The grain direction of the added material is indicated with arrows and is patterned as illustrated in FIG. 3A.

Example 9

Self-Transforming Structures with Biaxial Flexible, Fibrous Composite

Figure 18A:
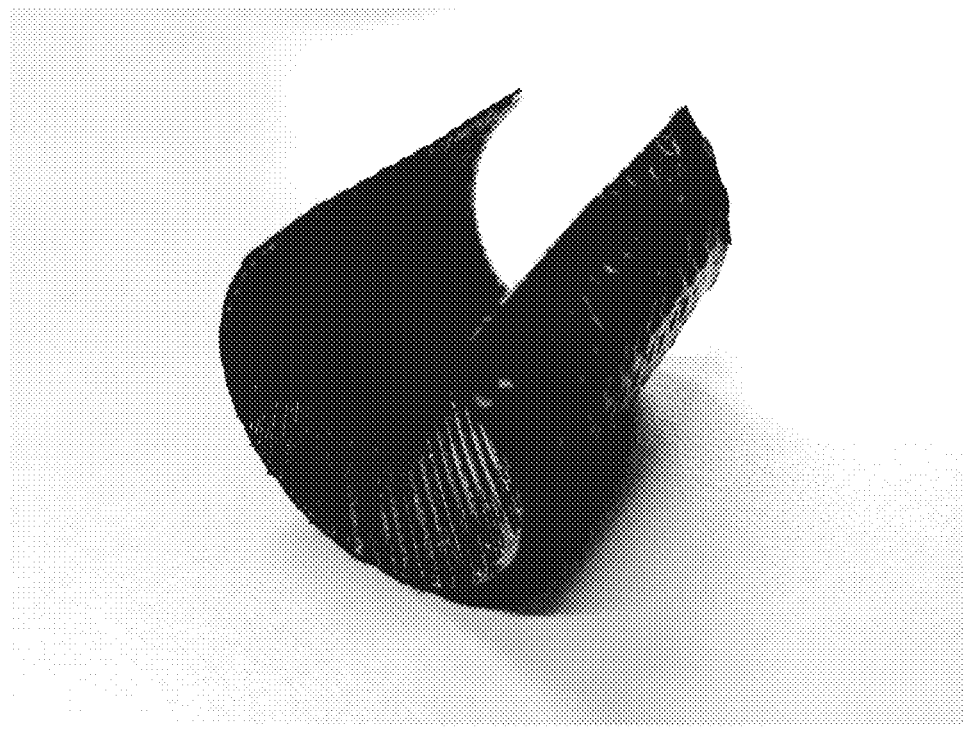
FIGS. 18A-D are photographs of self-transforming structures made using a biaxial flexible, fibrous composite. A) Curve; B) Fold; C) Wave; D) Spiral.
Figure 18B:
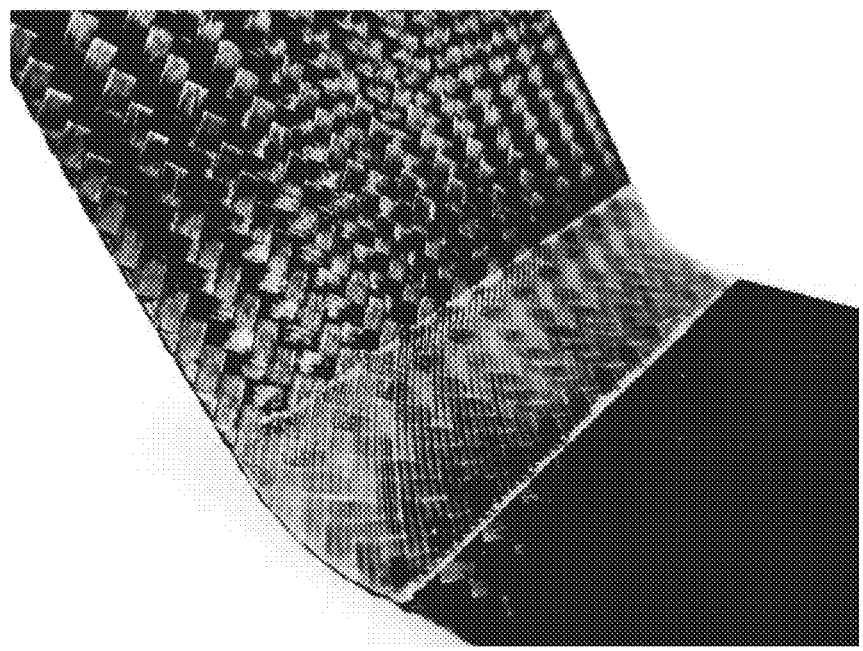
Figure 18C:
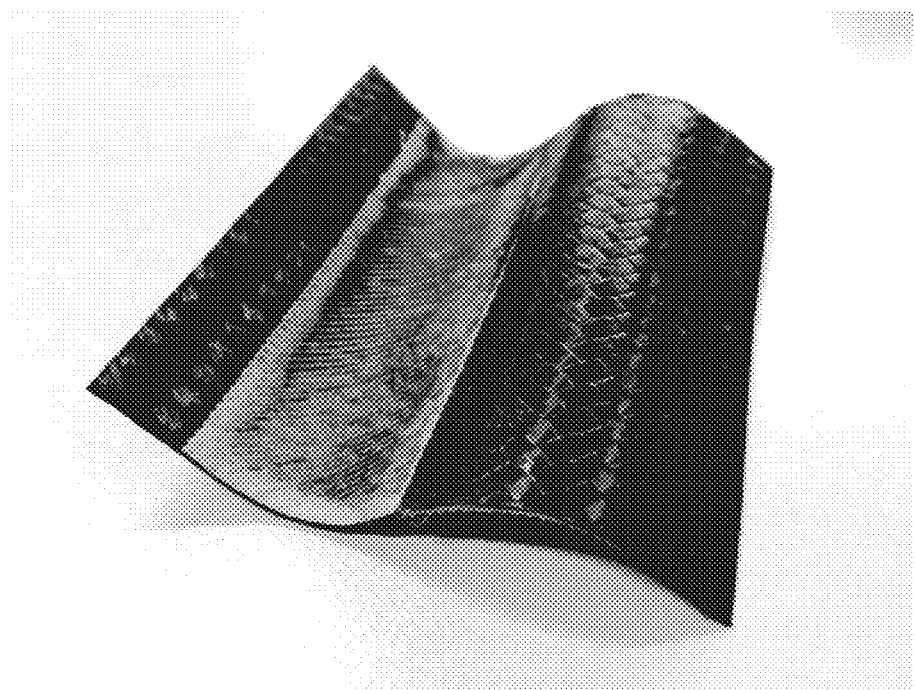
Figure 18D:

FIGS. 18A-D are photographs of self-transforming structures. For each photograph, the flexible, fibrous composite is Carbitex A324, and the added material is Nylon 618. For each photograph, the added material was printed onto the flexible, fibrous composite using a Fused Deposition Modeling (FDM) 3D printer. Each of the photographs was taken at a room temperature. FIG. 18A is a photograph of a curve transformation, in which the added material was printed onto the flexible, fibrous composite according to FIG. 2B. FIG. 18B is a photograph of a fold transformation, in which the added material was printed onto the flexible, fibrous composite according to FIG. 2A. FIG. 18C is a wave transformation, in which the added material was printed onto the flexible, fibrous composite according to FIG. 2E. FIG. 18D is a spiral transformation, in which the added material was printed onto the flexible, fibrous composite according to FIG. 2D.

INCORPORATION BY REFERENCE AND EQUIVALENTS

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:
1. A self-transforming structure comprising:
   a) a flexible, carbon fiber composite having a boundary and fibers along one or more axes; and
   b) an added material having a boundary and a grain pattern, wherein the added material is selected from the group consisting of nylon, biaxially-oriented polyethylene terephthalate (BoPET) and polypropylene, the grain pattern consisting of substantially parallel grains, the added material coupled to a surface of the flexible, carbon fiber composite to form a structure, the flexible, carbon fiber composite and the added material having different coefficients of expansion in response to an external stimulus to cause the structure to self-transform, the grain pattern of the added material oriented relative to the fibers of the flexible, carbon fiber composite to enable predictable self-transformation of the structure responsive to the external stimulus.
2. The self-transforming structure of claim 1, wherein the fibers of the flexible, carbon fiber composite are oriented biaxially.
3. The self-transforming structure of claim 2, wherein the grain pattern of the added material is orthogonal to an axis of a fiber of the flexible, carbon fiber composite.
4. The self-transforming structure of claim 2, wherein the grain pattern of the added material is 45° to an axis of a fiber of the flexible, carbon fiber composite.
5. The self-transforming structure of claim 2, wherein the grain of the added material is oriented at a 45° angle to the boundary of the flexible, carbon fiber composite.
6. The self-transforming structure of claim 2, wherein the grain of the added material is orthogonal to the boundary of the flexible, carbon fiber composite.
7. The self-transforming structure of claim 2, wherein the length of the boundary of the added material is shorter than the length of the boundary of the flexible, carbon fiber composite.

8. The self-transforming structure of claim 2, wherein the length of the boundary of the added material is the same as the length of the boundary of the flexible, carbon fiber composite.

9. The self-transforming structure of claim 2, wherein the fibers of the flexible, carbon fiber composite are oriented at 45° angles relative to the boundary of the flexible, carbon fiber composite.

10. The self-transforming structure of claim 2, wherein the fibers of the flexible, carbon fiber composite are orthogonal to the boundary of the flexible, carbon fiber composite.

11. The self-transforming structure of claim 2, wherein the flexible, carbon fiber composite is square, rectangular, or round.

12. The self-transforming structure of claim 2, wherein the flexible, carbon fiber composite is rectangular.

13. The self-transforming structure of claim 2, wherein: a) the grain of the added material is orthogonal to an axis of a fiber of the flexible, carbon fiber composite; b) the grain of the added material is oriented at 45° relative to the boundary of the flexible, carbon fiber composite; c) the length of the boundary of the added material is shorter than the length of the boundary of the flexible, carbon fiber composite; and d) the fibers of the flexible, carbon fiber composite are oriented at 45° relative to the boundary of the flexible, carbon fiber composite.

14. The self-transforming structure of claim 2, wherein: a) the grain of the added material is orthogonal to an axis of a fiber of the flexible, carbon fiber composite; b) the grain of the added material is oriented at 45° relative to the boundary of the flexible, carbon fiber composite; c) the length of the boundary of the added material is the same as the length of the boundary of the flexible, carbon fiber composite; and d) the fibers of the flexible, carbon fiber composite are oriented at 45° relative to the boundary of the flexible, carbon fiber composite.

15. The self-transforming structure of claim 2, wherein: a) the grain of the added material is orthogonal relative to an axis of a fiber of the flexible, carbon fiber composite; b) the grain of the added material is orthogonal relative to the boundary of the flexible, carbon fiber composite; c) the length of the boundary of the added material is shorter than the length of the boundary of the flexible, carbon fiber composite; and d) the fibers of the flexible, carbon fiber composite are orthogonal relative to the boundary of the flexible, carbon fiber composite.

16. The self-transforming structure of claim 2, wherein: a) the grain of the added material is oriented at a 45° angle relative to an axis of a fiber of the flexible, carbon fiber composite; b) the grain of the added material is orthogonal relative to the boundary of the flexible, carbon fiber composite; c) the length of the boundary of the added material is the same length as the boundary of the flexible, carbon fiber composite; and d) the fibers of the flexible, carbon fiber composite are oriented at a 45° angle relative to the boundary of the flexible, carbon fiber composite.

17. The self-transforming structure of claim 13, wherein substantially parallel grains of the added material are on opposite surfaces of the flexible, carbon fiber composite.

18. The self-transforming structure of claim 5, wherein: a) the grain of the added material is orthogonal to an axis of a fiber of the flexible, carbon fiber composite; b) the grain of the added material is oriented at 45° relative to the boundary of the flexible, carbon fiber composite; c) the length of the boundary of the added material is the same as the length of the boundary of the flexible, carbon fiber composite; and d) the fibers of the flexible, carbon fiber composite are oriented at 45° relative to the boundary of the flexible, carbon fiber composite, and wherein the added material provides equal forces in two directions, thereby providing bi-stability.

19. The self-transforming structure of claim 1, wherein the fibers of the flexible, carbon fiber composite are oriented triaxially.

20. The self-transforming structure of claim 19, wherein the grain of the added material is orthogonal to an axis of a fiber of the flexible, carbon fiber composite.

21. The self-transforming structure of claim 19, wherein the grain of the added material is oriented at an angle of 0°, 60°, or 120° relative to the boundary of the flexible, carbon fiber composite.

22. The self-transforming structure of claim 19, wherein the length of the boundary of the added material is the same length as the boundary of the flexible, carbon fiber composite.

23. The self-transforming structure of claim 19, wherein the fibers of the flexible, carbon fiber composite are oriented at 60° and 120° angles relative to the boundary of the flexible, carbon fiber composite.

24. The self-transforming structure of claim 19, wherein: a) the grain of the added material is orthogonal to an axis of a fiber of the flexible, carbon fiber composite; b) the grain of the added material is oriented at a 0° angle relative to the boundary of the flexible, carbon fiber composite; c) the length of the boundary of the added material is the same length as the boundary of the flexible, carbon fiber composite; and d) the fibers of the flexible, carbon fiber composite are oriented at 60° and 120° angles relative to the boundary of the flexible, carbon fiber composite.

25. The self-transforming structure of claim 19, wherein: a) the grain of the added material is orthogonal to an axis of a fiber of the flexible, carbon fiber composite; b) the grain of the added material is oriented at a 60° angle relative to the boundary of the flexible, carbon fiber composite; c) the length of the boundary of the added material is the same length as the boundary of the flexible, carbon fiber composite; and d) the fibers of the flexible, carbon fiber composite are oriented at 60° and 120° angles relative to the boundary of the flexible, carbon fiber composite.

26. The self-transforming structure of claim 19, wherein: a) the grain of the added material is orthogonal to an axis of a fiber of the flexible, carbon fiber composite; b) the grain of the added material is oriented at a 120° angle relative to the boundary of the flexible, carbon fiber composite; c) the length of the boundary of the added material is the same length as the boundary of the flexible, carbon fiber composite; and d) the fibers of the flexible, carbon fiber composite are oriented at 60° and 120° angles relative to the boundary of the flexible, carbon fiber composite.

27. The self-transforming structure of claim 1, wherein the fibers of the flexible, carbon fiber composite are uniaxial.

28. The self-transforming structure of claim 27, wherein the grain of the added material is orthogonal to an axis of a fiber of the flexible, carbon fiber composite.

29. The self-transforming structure of claim 27, wherein the grain of the added material is oriented at an angle of 0°, orthogonal, or 45° relative to the boundary of the flexible, carbon fiber composite.

30. The self-transforming structure of claim 27, wherein the length of the boundary of the added material is the same length as the boundary of the flexible, carbon fiber composite.

31. The self-transforming structure of claim 27, wherein the fibers of the flexible, carbon fiber composite are orthogonal relative to the boundary of the flexible, carbon fiber composite.

32. The self-transforming structure of claim 27, wherein: a) the grain of the added material is orthogonal to an axis of a fiber of the flexible, carbon fiber composite; b) the grain of the added material is oriented at a 0° angle relative to the boundary of the flexible, carbon fiber composite; c) the length of the boundary of the added material is the same length as the boundary of the flexible, carbon fiber composite; and d) the fibers of the flexible, carbon fiber composite are orthogonal to the boundary of the flexible, carbon fiber composite.

33. The self-transforming structure of claim 27, wherein: a) the grain of the added material is orthogonal to an axis of a fiber of the flexible, carbon fiber composite; b) the grain of the added material is orthogonal to the boundary of the flexible, carbon fiber composite; c) the length of the boundary of the added material is the same length as the boundary of the flexible, carbon fiber composite; and d) the fibers of the flexible, carbon fiber composite are orthogonal to the boundary of the flexible, carbon fiber composite.

34. The self-transforming structure of claim 27, wherein: a) the grain of the added material is orthogonal to an axis of a fiber of the flexible, carbon fiber composite; b) the grain of the added material is oriented at a 45° angle relative to the boundary of the flexible, carbon fiber composite; c) the length of the boundary of the added material is the same length as the boundary of the flexible, carbon fiber composite; and d) the fibers of the flexible, carbon fiber composite are orthogonal to the boundary of the flexible, carbon fiber composite.

35. The self-transforming structure of claim 1, wherein the external stimulus can be exposure to a temperature change.

36. The self-transforming structure of claim 35, wherein the temperature change can be caused by a laser, infrared light, or electrical resistive heating.

37. The self-transforming structure of claim 1, wherein the external stimulus can be exposure to water or removal of exposure to water.

38. A method of making a self-transforming structure, the method comprising:
coupling an added material to a surface of a flexible, carbon fiber composite to form a structure, the flexible, carbon fiber composite having a boundary and fibers along one or more axes, wherein the added material is selected from the group consisting of nylon, biaxially-oriented polyethylene terephthalate (BoPET) and polypropylene,
wherein the added material has a boundary and a grain pattern, the grain pattern consisting of substantially parallel grains,
wherein the flexible, carbon fiber composite and the added material have different coefficients of expansion in response to an external stimulus to cause the structure to self-transform,
and wherein the grain pattern of the added material is oriented relative to the fibers of the flexible, carbon fiber composite to enable predictable self-transformation of the structure responsive to the external stimulus.

39. The method of claim 38, wherein coupling the added material to the flexible, carbon fiber composite comprises printing the added material onto the flexible, carbon fiber composite by additive manufacturing.

40. The method of claim 38, wherein coupling the added material to the flexible, carbon fiber composite comprises laminating the added material onto the flexible, carbon fiber composite.

* * * * *